United States Patent
Lundberg

(10) Patent No.: US 11,360,988 B2
(45) Date of Patent: *Jun. 14, 2022

(54) SYSTEMS, METHODS AND USER INTERFACES IN A PATENT MANAGEMENT SYSTEM

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,223

(22) Filed: Sep. 29, 2020

(65) Prior Publication Data

US 2021/0117433 A1    Apr. 22, 2021

Related U.S. Application Data

(63) Continuation of application No. 16/274,228, filed on Feb. 12, 2019, now Pat. No. 10,803,073, which is a (Continued)

(51) Int. Cl.
*G06F 17/00*    (2019.01)
*G06F 16/2457*    (2019.01)
(Continued)

(52) U.S. Cl.
CPC ...... *G06F 16/24578* (2019.01); *G06F 16/248* (2019.01); *G06F 16/2455* (2019.01);
(Continued)

(58) Field of Classification Search
CPC .... G06F 16/93; G06F 16/26; G06F 16/24578; G06F 16/2455; G06F 16/9535;
(Continued)

(56) References Cited

U.S. PATENT DOCUMENTS 4,807,154 A    2/1989    Scully et al.
4,868,733 A    9/1989    Fujisawa et al.
(Continued)

FOREIGN PATENT DOCUMENTS

EP    0638870 A1    2/1995
GB    2156112 A    10/1985
(Continued)

OTHER PUBLICATIONS

"U.S. Appl. No. 13/309,166, Advisory Action dated Dec. 1, 2017", 3 pgs.
(Continued)

*Primary Examiner* — Manglesh M Patel
(74) *Attorney, Agent, or Firm* — Schwegman Lundberg & Woessner, P.A.

(57) ABSTRACT

A system and method are provided for automatically proofing the patent specification of a granted patent issued on a patent application. The method comprises the steps of scanning amendments made to the patent application during prosecution; assembling the most recent claims, based on the scanned amendments, to create a test claim set of the claims; comparing the test claim set to the claims of the issued patent as published; and identifying any differences between the compared sets of claims and communicating the differences to a user.

20 Claims, 6 Drawing Sheets

Related U.S. Application Data continuation of application No. 13/309,166, filed on Dec. 1, 2011, now Pat. No. 10,242,066.

(60) Provisional application No. 61/561,502, filed on Nov. 18, 2011, provisional application No. 61/542,515, filed on Oct. 3, 2011.

(51) Int. Cl.

| | | |
|---|---|---|
| *G06F 16/26* | (2019.01) | |
| *G06F 16/93* | (2019.01) | |
| *G06F 16/248* | (2019.01) | |
| *G06F 16/25* | (2019.01) | |
| *G06F 16/2455* | (2019.01) | |
| *G06F 16/9535* | (2019.01) | |
| *G06Q 10/10* | (2012.01) | |
| *G06F 40/237* | (2020.01) | |
| *G06Q 50/18* | (2012.01) | |

(52) U.S. Cl.
CPC ........... *G06F 16/252* (2019.01); *G06F 16/26* (2019.01); *G06F 16/93* (2019.01); *G06F 16/9535* (2019.01); *G06F 40/237* (2020.01); *G06Q 10/10* (2013.01); *G06Q 50/184* (2013.01); *G06F 2216/11* (2013.01)

(58) Field of Classification Search
CPC .... G06F 16/248; G06F 16/252; G06F 40/237; G06F 2216/11; G06Q 10/10; G06Q 50/184
USPC .......................................... 715/255, 277, 200
See application file for complete search history.

(56) References Cited

U.S. PATENT DOCUMENTS

| | | |
|---|---|---|
| 5,297,039 A | 3/1994 | Kanaegami et al. |
| 5,329,447 A | 7/1994 | Leedom, Jr. |
| 5,404,506 A | 4/1995 | Fujisawa et al. |
| 5,410,646 A | 4/1995 | Tondevold et al. |
| 5,530,852 A | 6/1996 | Meske et al. |
| 5,548,506 A | 8/1996 | Srinivasan |
| 5,548,753 A | 8/1996 | Linstead et al. |
| 5,553,226 A | 9/1996 | Kiuchi et al. |
| 5,555,408 A | 9/1996 | Fujisawa et al. |
| 5,557,515 A | 9/1996 | Abbruzzese et al. |
| 5,592,664 A | 1/1997 | Starkey |
| 5,623,679 A | 4/1997 | Rivette et al. |
| 5,623,681 A | 4/1997 | Rivette et al. |
| 5,644,740 A | 7/1997 | Kiuchi |
| 5,659,729 A | 8/1997 | Nielsen |
| 5,664,063 A | 9/1997 | Johnson et al. |
| 5,664,714 A | 9/1997 | Navarro et al. |
| 5,696,916 A | 12/1997 | Yamazaki et al. |
| 5,699,528 A | 12/1997 | Hogan |
| 5,706,502 A | 1/1998 | Foley et al. |
| 5,721,910 A | 2/1998 | Unger et al. |
| 5,745,745 A | 4/1998 | Tada et al. |
| 5,754,840 A | 5/1998 | Rivette et al. |
| 5,758,328 A | 5/1998 | Giovannoli |
| 5,794,236 A | 8/1998 | Mehrle |
| 5,799,325 A | 8/1998 | Rivette et al. |
| 5,809,318 A | 9/1998 | Rivette et al. |
| 5,850,520 A | 12/1998 | Greibenow et al. |
| 5,870,745 A | 2/1999 | McCune |
| 5,895,468 A | 4/1999 | Whitmyer, Jr. |
| 5,903,881 A | 5/1999 | Schrader et al. |
| 5,907,837 A | 5/1999 | Ferrel et al. |
| 5,953,726 A | 9/1999 | Carter et al. |
| 5,991,751 A | 11/1999 | Rivette et al. |
| 5,991,756 A | 11/1999 | Wu |
| 5,991,780 A | 11/1999 | Rivette et al. |
| 5,999,907 A | 12/1999 | Donner et al. |
| 6,006,221 A | 12/1999 | Liddy et al. |
| 6,014,663 A | 1/2000 | Rivette et al. |
| 6,038,561 A | 3/2000 | Snyder et al. |
| 6,049,801 A | 4/2000 | Whitmyer, Jr. |
| 6,055,538 A | 4/2000 | Kessenich et al. |
| 6,076,088 A | 6/2000 | Paik et al. |
| 6,094,652 A | 7/2000 | Faisal |
| 6,182,062 B1 | 1/2001 | Fujisawa et al. |
| 6,182,078 B1 | 1/2001 | Whitmyer, Jr. |
| 6,216,128 B1 | 4/2001 | Di-Crescenzo et al. |
| 6,226,792 B1 | 5/2001 | Goiffon et al. |
| 6,263,335 B1 | 7/2001 | Paik et al. |
| 6,327,593 B1 | 12/2001 | Goiffon |
| 6,339,767 B1 | 1/2002 | Rivette et al. |
| 6,363,361 B1 | 3/2002 | Lundberg |
| 6,363,378 B1 | 3/2002 | Conklin et al. |
| 6,401,118 B1 | 6/2002 | Thomas |
| 6,405,190 B1 | 6/2002 | Conklin |
| 6,415,283 B1 | 7/2002 | Conklin |
| 6,434,580 B1 | 8/2002 | Takano et al. |
| 6,453,312 B1 | 9/2002 | Goiffon et al. |
| 6,499,026 B1 | 12/2002 | Rivette et al. |
| 6,502,081 B1 | 12/2002 | Wiltshire, Jr. et al. |
| 6,513,027 B1 | 1/2003 | Powers et al. |
| 6,526,440 B1 | 2/2003 | Bharat |
| 6,556,992 B1 | 4/2003 | Barney et al. |
| 6,560,620 B1 | 5/2003 | Ching |
| 6,574,632 B2 | 6/2003 | Fox et al. |
| 6,629,097 B1 | 9/2003 | Keith |
| 6,654,731 B1 | 11/2003 | Mahesh |
| 6,662,178 B2 | 12/2003 | Lee |
| 6,665,670 B2 | 12/2003 | Winer et al. |
| 6,675,159 B1 | 1/2004 | Lin et al. |
| 6,678,692 B1 | 1/2004 | Hyatt |
| 6,694,315 B1 | 2/2004 | Grow |
| 6,694,331 B2 | 2/2004 | Lee |
| 6,751,621 B1 | 6/2004 | Calistri-Yeh et al. |
| 6,766,315 B1 | 7/2004 | Bratsos et al. |
| 6,789,092 B1 | 9/2004 | Oppedahl et al. |
| 6,816,898 B1 | 11/2004 | Scarpelli et al. |
| 6,847,966 B1 | 1/2005 | Sommer et al. |
| 6,847,979 B2 | 1/2005 | Allemang et al. |
| 6,885,999 B1 | 4/2005 | Corless |
| 6,889,223 B2 | 5/2005 | Hattori et al. |
| 6,941,553 B2 | 9/2005 | Eisler et al. |
| 6,970,842 B1 | 11/2005 | Ashby |
| 6,970,881 B1 | 11/2005 | Mohan et al. |
| 6,976,016 B2 | 12/2005 | Chang et al. |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,051,022 B1 | 5/2006 | Faisal |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,185,172 B1 | 2/2007 | Mick, Jr. et al. |
| 7,221,016 B2 | 5/2007 | Inoue et al. |
| 7,231,384 B2 | 6/2007 | Wu et al. |
| 7,231,386 B2 | 6/2007 | Nonomura et al. |
| 7,281,008 B1 | 10/2007 | Lawrence et al. |
| 7,293,018 B2 | 11/2007 | Hattori et al. |
| 7,296,015 B2 | 11/2007 | Poltorak |
| 7,305,625 B1 | 12/2007 | Zilka et al. |
| 7,369,701 B2 | 5/2008 | Lundberg |
| 7,383,294 B1 | 6/2008 | Tamer et al. |
| 7,395,261 B1 | 7/2008 | Atzel |
| 7,444,589 B2 | 10/2008 | Zellner |
| 7,493,253 B1 | 2/2009 | Ceusters et al. |
| 7,523,126 B2 | 4/2009 | Rivette et al. |
| 7,536,446 B2 | 5/2009 | Blumberg |
| 7,653,631 B1 | 1/2010 | Lundberg |
| 7,676,375 B1 | 3/2010 | Neifeld et al. |
| 7,680,733 B1 | 3/2010 | Lundberg |
| 7,698,330 B2 | 4/2010 | Kim |
| 7,702,640 B1 | 4/2010 | Vermeulen et al. |
| 7,716,226 B2 | 5/2010 | Barney |

(56) References Cited

U.S. PATENT DOCUMENTS

| | | |
|---|---|---|
| 7,716,581 B2 | 5/2010 | Tran |
| 7,734,545 B1 | 6/2010 | Fogliano et al. |
| 7,769,685 B2 | 8/2010 | Malackowski et al. |
| 7,801,889 B2 | 9/2010 | Kim et al. |
| 7,801,909 B2 | 9/2010 | Poltorak |
| 7,823,061 B2 | 10/2010 | Chan et al. |
| 7,836,048 B2 | 11/2010 | Schneider |
| 7,962,511 B2 | 6/2011 | Barney |
| 7,966,328 B2 | 6/2011 | Germeraad et al. |
| 7,983,928 B2 | 7/2011 | Lee |
| 7,996,753 B1 | 8/2011 | Chan et al. |
| 8,000,528 B2 | 8/2011 | Ming et al. |
| 8,005,760 B1 | 8/2011 | Lee |
| 8,041,739 B2 | 10/2011 | Glasgow |
| 8,078,545 B1 | 12/2011 | Zilka et al. |
| 8,095,581 B2 | 1/2012 | Stobbs et al. |
| 8,131,701 B2 | 3/2012 | Barney |
| 8,160,306 B1 | 4/2012 | Neustel |
| 8,161,025 B2 | 4/2012 | Lundberg et al. |
| 8,196,030 B1 | 6/2012 | Wang et al. |
| 8,204,816 B2 | 6/2012 | Brodsky et al. |
| 8,254,692 B2 | 8/2012 | Ramachandrula et al. |
| 8,275,708 B1 | 9/2012 | Dennes et al. |
| 8,380,548 B2 | 2/2013 | Ng et al. |
| 8,386,456 B1 | 2/2013 | Paiz |
| 8,447,758 B1 | 5/2013 | Adler et al. |
| 8,538,794 B2 | 9/2013 | Marko et al. |
| 8,543,511 B2 | 9/2013 | Wang |
| 8,589,413 B1 | 11/2013 | Mohan et al. |
| 8,600,900 B2 | 12/2013 | Lundberg |
| 8,713,078 B2 | 4/2014 | Kunjithapatham et al. |
| 8,892,547 B2 | 11/2014 | Lundberg |
| 8,972,385 B2 | 3/2015 | Lundberg |
| 9,201,966 B2 | 12/2015 | Lundberg |
| 9,286,351 B2 | 3/2016 | Lundberg |
| 9,396,274 B2 | 7/2016 | Lundberg |
| 9,652,546 B2 | 5/2017 | Lundberg |
| 9,679,019 B2 | 6/2017 | Lundberg |
| 9,858,319 B2 | 1/2018 | Lundberg et al. |
| 10,242,066 B2 | 3/2019 | Lundberg |
| 10,803,073 B2 | 10/2020 | Lundberg |
| 2001/0007977 A1 | 7/2001 | Geary |
| 2002/0007373 A1 | 1/2002 | Blair et al. |
| 2002/0022974 A1 | 2/2002 | Lindh |
| 2002/0023053 A1 | 2/2002 | Szoc et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0059076 A1 | 5/2002 | Grainger et al. |
| 2002/0065675 A1 | 5/2002 | Grainger et al. |
| 2002/0065677 A1 | 5/2002 | Grainger et al. |
| 2002/0072920 A1 | 6/2002 | Grainger |
| 2002/0077835 A1 | 6/2002 | Hagelin |
| 2002/0082778 A1 | 6/2002 | Barnett et al. |
| 2002/0091541 A1 | 7/2002 | Lundberg |
| 2002/0091542 A1 | 7/2002 | Grainger |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0116363 A1 | 8/2002 | Grainger |
| 2002/0138384 A1 | 9/2002 | Malackowski et al. |
| 2002/0138465 A1 | 9/2002 | Lee et al. |
| 2002/0138474 A1 | 9/2002 | Lee |
| 2002/0138475 A1 | 9/2002 | Lee |
| 2002/0143496 A1 | 10/2002 | Mactas et al. |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0175934 A1 | 11/2002 | Hand et al. |
| 2002/0175941 A1 | 11/2002 | Hand et al. |
| 2002/0177907 A1 | 11/2002 | Hand et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |
| 2003/0046307 A1 | 3/2003 | Rivette et al. |
| 2003/0050915 A1 | 3/2003 | Allemang et al. |
| 2003/0074354 A1 | 4/2003 | Lee et al. |
| 2003/0115191 A1 | 6/2003 | Copperman et al. |
| 2003/0167181 A1 | 9/2003 | Lundberg et al. |
| 2003/0187874 A1 | 10/2003 | Peschel et al. |
| 2003/0191654 A1 | 10/2003 | Panchal et al. |
| 2003/0195764 A1 | 10/2003 | Baker et al. |
| 2003/0212572 A1 | 11/2003 | Poltorak |
| 2003/0212706 A1 | 11/2003 | Shih |
| 2003/0220891 A1 | 11/2003 | Fish |
| 2003/0229470 A1 | 12/2003 | Pejic |
| 2004/0002892 A1 | 1/2004 | Gluck et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0010393 A1 | 1/2004 | Barney |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0059994 A1 | 3/2004 | Fogel et al. |
| 2004/0078192 A1 | 4/2004 | Poltorak |
| 2004/0078365 A1 | 4/2004 | Poltorak |
| 2004/0083206 A1 | 4/2004 | Wu et al. |
| 2004/0088332 A1 | 5/2004 | Lee et al. |
| 2004/0103112 A1 | 5/2004 | Colson et al. |
| 2004/0122841 A1 | 6/2004 | Goodman et al. |
| 2004/0133433 A1 | 7/2004 | Lee et al. |
| 2004/0133534 A1 | 7/2004 | Mahesh |
| 2004/0133555 A1 | 7/2004 | Toong et al. |
| 2004/0133566 A1 | 7/2004 | Ishiguro et al. |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186738 A1 | 9/2004 | Reisman |
| 2004/0199400 A1 | 10/2004 | Lundberg |
| 2004/0223648 A1 | 11/2004 | Hoene et al. |
| 2004/0236646 A1 | 11/2004 | Wu et al. |
| 2004/0260569 A1 | 12/2004 | Bell et al. |
| 2005/0004806 A1 | 1/2005 | Lin et al. |
| 2005/0005239 A1 | 1/2005 | Richards |
| 2005/0010863 A1 | 1/2005 | Zernik |
| 2005/0021522 A1 | 1/2005 | Herman et al. |
| 2005/0060303 A1 | 3/2005 | Wu et al. |
| 2005/0060306 A1 | 3/2005 | Hattori et al. |
| 2005/0080723 A1 | 4/2005 | Burchetta et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0131882 A1 | 6/2005 | Beretich et al. |
| 2005/0144177 A1 | 6/2005 | Hodes |
| 2005/0154673 A1 | 7/2005 | Fellenstein et al. |
| 2005/0165744 A1 | 7/2005 | Taylor et al. |
| 2005/0182755 A1 | 8/2005 | Tran |
| 2005/0198026 A1 | 9/2005 | Dehlinger et al. |
| 2005/0210008 A1 | 9/2005 | Tran et al. |
| 2005/0210009 A1 | 9/2005 | Tran |
| 2005/0216898 A1 | 9/2005 | Powell, Jr. et al. |
| 2005/0228684 A1 | 10/2005 | Pogodin et al. |
| 2005/0234738 A1 | 10/2005 | Hodes |
| 2005/0240595 A1 | 10/2005 | Chandrasekaran |
| 2005/0246194 A1 | 11/2005 | Lundberg |
| 2005/0256734 A1 | 11/2005 | Clikeman |
| 2005/0261927 A1 | 11/2005 | Bilak et al. |
| 2006/0015485 A1 | 1/2006 | Hofmann |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |

(56) References Cited

U.S. PATENT DOCUMENTS

| | | |
|---|---|---|
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074867 A1 | 4/2006 | Breitzman |
| 2006/0074991 A1 | 4/2006 | Lussier et al. |
| 2006/0085249 A1 | 4/2006 | Diaz et al. |
| 2006/0085478 A1 | 4/2006 | Landau et al. |
| 2006/0106793 A1 | 5/2006 | Liang |
| 2006/0106847 A1 | 5/2006 | Eckardt, III et al. |
| 2006/0112084 A1 | 5/2006 | Mcbeath et al. |
| 2006/0143162 A1 | 6/2006 | Bernacki et al. |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212302 A1 | 9/2006 | Lundberg et al. |
| 2006/0212402 A1 | 9/2006 | Lundberg et al. |
| 2006/0212471 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0224999 A1 | 10/2006 | Albrecht et al. |
| 2006/0225000 A1 | 10/2006 | Albrecht et al. |
| 2006/0229983 A1 | 10/2006 | Lundberg |
| 2006/0235811 A1 | 10/2006 | Fairweather |
| 2006/0258397 A1 | 11/2006 | Kaplan et al. |
| 2006/0287971 A1 | 12/2006 | Armstrong |
| 2007/0005575 A1 | 1/2007 | Dai et al. |
| 2007/0010994 A1 | 1/2007 | Mueller |
| 2007/0011175 A1 | 1/2007 | Langseth et al. |
| 2007/0050343 A1 | 3/2007 | Siddarampappa et al. |
| 2007/0057967 A1 | 3/2007 | Armstrong |
| 2007/0067297 A1 | 3/2007 | Kublickis |
| 2007/0073625 A1 | 3/2007 | Shelton |
| 2007/0073748 A1 | 3/2007 | Barney |
| 2007/0136116 A1 | 6/2007 | Germeraad et al. |
| 2007/0136373 A1 | 6/2007 | Piasecki |
| 2007/0150298 A1 | 6/2007 | Barney |
| 2007/0174041 A1 | 7/2007 | Yeske |
| 2007/0192272 A1 | 8/2007 | Elfayoumy et al. |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0219853 A1 | 9/2007 | Van Luchene et al. |
| 2007/0219988 A1 | 9/2007 | Mueller et al. |
| 2007/0220041 A1 | 9/2007 | Van Luchene et al. |
| 2007/0239705 A1 | 10/2007 | Hunt et al. |
| 2007/0245380 A1 | 10/2007 | Dommer et al. |
| 2007/0250468 A1 | 10/2007 | Pieper |
| 2007/0250488 A1 | 10/2007 | Lee |
| 2007/0029461 A1 | 12/2007 | Ching |
| 2007/0288256 A1 | 12/2007 | Speier |
| 2007/0288856 A1 | 12/2007 | Butlin et al. |
| 2008/0005103 A1 | 1/2008 | Ratcliffe et al. |
| 2008/0005144 A1 | 1/2008 | Katz et al. |
| 2008/0016069 A1 | 1/2008 | Holt |
| 2008/0030800 A1 | 2/2008 | Matsukawa et al. |
| 2008/0097931 A1 | 4/2008 | Grotto |
| 2008/0104032 A1 | 5/2008 | Sarkar |
| 2008/0109454 A1 | 5/2008 | Willse et al. |
| 2008/0140644 A1 | 6/2008 | Franks et al. |
| 2008/0154767 A1 | 6/2008 | D'agostino |
| 2008/0154848 A1 | 6/2008 | Haslam et al. |
| 2008/0162444 A1 | 7/2008 | Lee et al. |
| 2008/0183518 A1 | 7/2008 | Jiang et al. |
| 2008/0195568 A1 | 8/2008 | Chen et al. |
| 2008/0216013 A1 | 9/2008 | Lundberg et al. |
| 2008/0281748 A1 | 11/2008 | Newman |
| 2008/0281821 A1 | 11/2008 | Chen et al. |
| 2008/0301138 A1 | 12/2008 | Hasan et al. |
| 2008/0312981 A1 | 12/2008 | Marlett et al. |
| 2009/0006328 A1 | 1/2009 | Lindberg et al. |
| 2009/0007200 A1 | 1/2009 | Amento et al. |
| 2009/0012827 A1 | 1/2009 | Avrunin |
| 2009/0012937 A1 | 1/2009 | Lee et al. |
| 2009/0030713 A1 | 1/2009 | Venkatachalam |
| 2009/0043797 A1 | 2/2009 | Dorie et al. |
| 2009/0048925 A1 | 2/2009 | Song et al. |
| 2009/0055721 A1 | 2/2009 | Kahn |
| 2009/0063468 A1 | 3/2009 | Berg |
| 2009/0070301 A1 | 3/2009 | McLean et al. |
| 2009/0083049 A1 | 3/2009 | Sciarrino et al. |
| 2009/0150326 A1 | 6/2009 | Sheets |
| 2009/0157717 A1 | 6/2009 | Palahnuk et al. |
| 2009/0164404 A1 | 6/2009 | Sampath et al. |
| 2009/0164431 A1 | 6/2009 | Zivkovic et al. |
| 2009/0216994 A1 | 8/2009 | Hsieh et al. |
| 2009/0228777 A1 | 9/2009 | Henry et al. |
| 2009/0248468 A1 | 10/2009 | Cronin et al. |
| 2009/0257396 A1 | 10/2009 | Eliezer et al. |
| 2009/0259459 A1 | 10/2009 | Ceusters et al. |
| 2009/0259506 A1 | 10/2009 | Barney |
| 2009/0265274 A1 | 10/2009 | Hahn-Carlson et al. |
| 2009/0282054 A1 | 11/2009 | Casey |
| 2010/0005094 A1 | 1/2010 | Poltorak |
| 2010/0023386 A1 | 1/2010 | Avisar et al. |
| 2010/0030680 A1 | 2/2010 | Malackowski et al. |
| 2010/0057533 A1 | 3/2010 | Martinez Ruiz et al. |
| 2010/0082395 A1 | 4/2010 | De Andrade |
| 2010/0106752 A1 | 4/2010 | Eckardt, III et al. |
| 2010/0114587 A1 | 5/2010 | Masuyama et al. |
| 2010/0131513 A1 | 5/2010 | Lundberg et al. |
| 2010/0174698 A1 | 7/2010 | Odland et al. |
| 2010/0179948 A1 | 7/2010 | Xie et al. |
| 2010/0180223 A1 | 7/2010 | Speier |
| 2010/0185689 A1 | 7/2010 | Hu et al. |
| 2010/0191564 A1 | 7/2010 | Lee et al. |
| 2010/0191622 A1 | 7/2010 | Reiss et al. |
| 2010/0191702 A1 | 7/2010 | Hofmann |
| 2010/0235337 A1 | 9/2010 | Shanahan et al. |
| 2010/0250479 A1 | 9/2010 | Carter |
| 2010/0287478 A1 | 11/2010 | Avasarala et al. |
| 2010/0306825 A1 | 12/2010 | Spivack |
| 2010/0332511 A1 | 12/2010 | Stockton et al. |
| 2011/0029476 A1 | 2/2011 | Kasravi et al. |
| 2011/0047166 A1 | 2/2011 | Stading et al. |
| 2011/0072014 A1 | 3/2011 | Lundberg et al. |
| 2011/0072024 A1 | 3/2011 | Barney |
| 2011/0093449 A1 | 4/2011 | Belenzon et al. |
| 2011/0099084 A1 | 4/2011 | Horn et al. |
| 2011/0099186 A1 | 4/2011 | Zohar et al. |
| 2011/0112824 A1 | 5/2011 | Sayers et al. |
| 2011/0113385 A1 | 5/2011 | Sayers et al. |
| 2011/0119134 A1 | 5/2011 | Zivkovic et al. |
| 2011/0153509 A1 | 6/2011 | Lundberg et al. |
| 2011/0153852 A1 | 6/2011 | Thomas |
| 2011/0191314 A1 | 8/2011 | Howes et al. |
| 2011/0197121 A1 | 8/2011 | Kletter |
| 2011/0225159 A1 | 9/2011 | Murray |
| 2011/0231449 A1 | 9/2011 | Ashley et al. |
| 2011/0246379 A1 | 10/2011 | Maddox et al. |
| 2011/0246473 A1 | 10/2011 | Stec |
| 2011/0288984 A1 | 11/2011 | Thomas |
| 2011/0289096 A1 | 11/2011 | Barney |
| 2011/0307499 A1 | 12/2011 | Elias et al. |
| 2011/0320367 A1 | 12/2011 | Kan et al. |
| 2011/0320582 A1 | 12/2011 | Lewis |
| 2012/0016859 A1 | 1/2012 | Sears |
| 2012/0095984 A1 | 4/2012 | Wren-hilton et al. |
| 2012/0096027 A1 | 4/2012 | Coult |
| 2012/0102427 A1 | 4/2012 | Fenster et al. |
| 2012/0109642 A1 | 5/2012 | Stobbs et al. |
| 2012/0116989 A1 | 5/2012 | Lai et al. |
| 2012/0117082 A1 | 5/2012 | Koperda et al. |
| 2012/0130773 A1 | 5/2012 | Abu-ghazalah et al. |
| 2012/0130993 A1 | 5/2012 | Lundberg et al. |
| 2012/0174017 A1 | 7/2012 | Tidwell et al. |
| 2012/0215768 A1 | 8/2012 | Zellweger |
| 2012/0221580 A1 | 8/2012 | Barney |
| 2012/0239591 A1 | 9/2012 | Powell, Jr. et al. |

(56) References Cited

U.S. PATENT DOCUMENTS

| | | |
|---|---|---|
| 2012/0240026 A1 | 9/2012 | Iyer et al. |
| 2012/0254155 A1 | 10/2012 | Heim et al. |
| 2012/0278244 A1 | 11/2012 | Lee et al. |
| 2012/0290487 A1 | 11/2012 | Lee et al. |
| 2012/0317041 A1 | 12/2012 | Shaffer et al. |
| 2013/0007578 A1 | 1/2013 | Shreck et al. |
| 2013/0013645 A1 | 1/2013 | Dias et al. |
| 2013/0084009 A1 | 4/2013 | Lundberg |
| 2013/0085911 A1 | 4/2013 | Lundberg |
| 2013/0085912 A1 | 4/2013 | Lundberg |
| 2013/0085929 A1 | 4/2013 | Lundberg |
| 2013/0085933 A1 | 4/2013 | Lundberg |
| 2013/0085934 A1 | 4/2013 | Lundberg |
| 2013/0085946 A1 | 4/2013 | Lundberg |
| 2013/0085947 A1 | 4/2013 | Lundberg |
| 2013/0085948 A1 | 4/2013 | Lundberg |
| 2013/0085949 A1 | 4/2013 | Lundberg |
| 2013/0085950 A1 | 4/2013 | Marais |
| 2013/0085964 A1 | 4/2013 | Marais |
| 2013/0086032 A1 | 4/2013 | Lundberg |
| 2013/0086033 A1 | 4/2013 | Lundberg |
| 2013/0086042 A1 | 4/2013 | Lundberg |
| 2013/0086043 A1 | 4/2013 | Lundberg |
| 2013/0086044 A1 | 4/2013 | Lundberg |
| 2013/0086045 A1 | 4/2013 | Lundberg |
| 2013/0086046 A1 | 4/2013 | Lundberg |
| 2013/0086047 A1 | 4/2013 | Lundberg et al. |
| 2013/0086048 A1 | 4/2013 | Lundberg et al. |
| 2013/0086049 A1 | 4/2013 | Lundberg et al. |
| 2013/0086050 A1 | 4/2013 | Lundberg |
| 2013/0086070 A1 | 4/2013 | Lundberg |
| 2013/0086080 A1 | 4/2013 | Lundberg |
| 2013/0086084 A1 | 4/2013 | Lundberg |
| 2013/0086093 A1 | 4/2013 | Lundberg |
| 2013/0086094 A1 | 4/2013 | Lundberg |
| 2013/0086106 A1 | 4/2013 | Lundberg |
| 2013/0086117 A1 | 4/2013 | Lundberg |
| 2013/0086120 A1 | 4/2013 | Lundberg et al. |
| 2013/0086257 A1 | 4/2013 | Lundberg |
| 2013/0086469 A1 | 4/2013 | Lundberg |
| 2013/0132302 A1 | 5/2013 | Lundberg et al. |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0282599 A1 | 10/2013 | Kang et al. |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0032513 A1 | 1/2014 | Gaither |
| 2014/0089210 A1 | 3/2014 | Lundberg |
| 2014/0108273 A1 | 4/2014 | Lundberg et al. |
| 2014/0258153 A1 | 9/2014 | Lundberg |
| 2014/0379388 A1 | 12/2014 | Lundberg et al. |
| 2015/0066842 A1 | 3/2015 | Lundberg |
| 2015/0121185 A1 | 4/2015 | Holt et al. |
| 2015/0149368 A1 | 5/2015 | Lundberg |
| 2015/0169777 A1 | 6/2015 | Lundberg |
| 2015/0347604 A1 | 12/2015 | Lundberg |
| 2015/0347605 A1 | 12/2015 | Lundberg et al. |
| 2015/0348217 A1 | 12/2015 | Lundberg |
| 2016/0154863 A1 | 6/2016 | Lundberg |
| 2016/0378766 A1 | 12/2016 | Lundberg |
| 2017/0075929 A1 | 3/2017 | Lundberg |
| 2017/0316036 A1 | 11/2017 | Lundberg |
| 2017/0351682 A1 | 12/2017 | Lundberg |
| 2019/0384770 A1 | 12/2019 | Lundberg |

FOREIGN PATENT DOCUMENTS

| | | |
|---|---|---|
| GB | 2260007 A | 3/1993 |
| WO | WO-9816890 A1 | 4/1998 |
| WO | WO-0243306 A2 | 5/2002 |
| WO | WO-02080039 A1 | 10/2002 |
| WO | WO-2006015110 A2 | 2/2006 |
| WO | WO-2006015110 A3 | 2/2006 |
| WO | WO-2007014341 A2 | 2/2007 |
| WO | WO-2007014341 A3 | 2/2007 |
| WO | WO-2007014341 C2 | 2/2007 |
| WO | WO-2011123517 A1 | 10/2011 |

OTHER PUBLICATIONS

"U.S. Appl. No. 13/309,166, Appeal Brief filed Sep. 1, 2016", 17 pgs.

"U.S. Appl. No. 13/309,166, Examiner Interview Summary dated May 20, 2015", 3 pgs.

"U.S. Appl. No. 13/309,166, Examiner Interview Summary dated Nov. 13, 2017", 5 pgs.

"U.S. Appl. No. 13/309,166, Final Office Action dated Aug. 10, 2017", 15 pgs.

"U.S. Appl. No. 13/309,166, Final Office Action dated Sep. 1, 2015", 11 pgs.

"U.S. Appl. No. 13/309,166, Final Office Action dated Nov. 13, 2013", 9 pgs.

"U.S. Appl. No. 13/309,166, Non Final Office Action dated Feb. 13, 2015", 10 pgs.

"U.S. Appl. No. 13/309,166, Non Final Office Action dated Feb. 22, 2013", 9 pgs.

"U.S. Appl. No. 13/309,166, Non Final Office Action dated Apr. 5, 2018", 8 pgs.

"U.S. Appl. No. 13/309,166, Non Final Office Action dated May 23, 2013", 9 pgs.

"U.S. Appl. No. 13/309,166, Non Final Office Action dated Dec. 29, 2016", 15 pgs.

"U.S. Appl. No. 13/309,166, Notice of Allowance dated Nov. 6, 2018", 8 pgs.

"U.S. Appl. No. 13/309,166, Response filed Jan. 10, 2018 to Final Office Action dated Aug. 10, 2017", 9 pgs.

"U.S. Appl. No. 13/309,166, Response filed Apr. 11, 2014 to Final Office Action dated Nov. 13, 2013", 13 pgs.

"U.S. Appl. No. 13/309,166, Response filed May 1, 2017 to Non Final Office Action dated Dec. 29, 2016", 14 pgs.

"U.S. Appl. No. 13/309,166, Response filed May 13, 2015 to Non Final Office Action dated Feb. 13, 2015", 8 pgs.

"U.S. Appl. No. 13/309,166, Response filed May 14, 2013 to Non Final Office Action dated Feb. 22, 2013", 10 pgs.

"U.S. Appl. No. 13/309,166, Response Filed Jul. 5, 2018 to Non Final Office Action dated Apr. 5, 2018", 12 pgs.

"U.S. Appl. No. 13/309,166, Response filed Aug. 15, 2013 to Non Final Office Action dated May 23, 2013", 11 pgs.

"U.S. Appl. No. 13/309,166, Response filed Nov. 6, 2017 to Final Office Action dated Aug. 10, 2017", 11 pgs.

"U.S. Appl. No. 13/573,803, Appeal Brief filed Dec. 29, 2015", 20 pgs.

"U.S. Appl. No. 13/573,803, Appeal Decision mailed Jul. 28, 2017", 24 pgs.

"U.S. Appl. No. 13/573,803, Final Office Action dated Apr. 7, 2015", 16 pgs.

"U.S. Appl. No. 13/573,803, Non Final Office Action dated Sep. 15, 2014", 15 pgs.

"U.S. Appl. No. 13/573,803, Non Final Office Action dated Dec. 5, 2013", 16 pgs.

"U.S. Appl. No. 13/573,803, Reply Brief filed Jul. 13, 2016", 6 pgs.

"U.S. Appl. No. 13/573,803, Response filed Jun. 5, 2014 to Non Final Office Action dated Dec. 5, 2013", 12 pgs.

"U.S. Appl. No. 13/573,803, Response filed Dec. 15, 2014 to Non Final Office Action dated Sep. 15, 2014", 12 pgs.

"U.S. Appl. No. 13/573,804, Final Office Action dated Mar. 23, 2015", 16 pgs.

"U.S. Appl. No. 13/573,804, Non Final Office Action dated Oct. 20, 2014", 15 pgs.

"U.S. Appl. No. 13/573,804, Response filed Jan. 20, 2015 to Non Final Office Action dated Oct. 20, 2014", 15 pgs.

"U.S. Appl. No. 13/573,804, Response filed Aug. 29, 2014 to Restriction Requirement dated Jun. 30, 2014", 8 pgs.

(56) References Cited

OTHER PUBLICATIONS

"U.S. Appl. No. 13/573,804, Restriction Requirement dated Jun. 30, 2014", 5 pgs.

"U.S. Appl. No. 14/010,376, Appeal Brief filed Apr. 19, 2016", 19 pgs.

"U.S. Appl. No. 14/010,376, Appeal Decision mailed Sep. 8, 2017", 17 pgs.

"U.S. Appl. No. 14/010,376, Final Office Action dated Aug. 19, 2015", 13 pgs.

"U.S. Appl. No. 14/010,376, Non Final Office Action dated Mar. 24, 2015", 10 pgs.

"U.S. Appl. No. 14/010,376, Reply Brief filed Nov. 22, 2016", 5 pgs.

"U.S. Appl. No. 14/010,376, Response filed Jun. 24, 2015 to Non Final Office Action dated Mar. 24, 2015", 10 pgs.

"U.S. Appl. No. 14/010,380, Appeal Decision mailed Sep. 27, 2017", 18 pgs.

"U.S. Appl. No. 14/010,380, Examiners Answer dated Nov. 9, 2016", 8 pgs.

"U.S. Appl. No. 14/010,380, Final Office Action dated Oct. 6, 2015", 11 pgs.

"U.S. Appl. No. 14/016,380, Non Final Office Action dated Apr. 15, 2015", 11 pgs.

"U.S. Appl. No. 14/010,380, Reply Brief filed Jan. 9, 2017", 6 pgs.

"U.S. Appl. No. 14/010,380, Response filed Aug. 17, 2015 to Non Final Office Action dated Apr. 15, 2015", 11 pgs.

"U.S. Appl. No. 14/010,391, Appeal Brief filed Aug. 15, 2016", 23 pgs.

"U.S. Appl. No. 14/010,391, Appeal Decision mailed Oct. 25, 2017", 19 pgs.

"U.S. Appl. No. 14/010,391, Examiners Answer dated Nov. 9, 2016", 10 pgs.

"U.S. Appl. No. 14/010,391, Final Office Action dated Sep. 15, 2015", 11 pgs.

"U.S. Appl. No. 14/010,391, Non Final Office Action dated Mar. 23, 2015", 11 pgs.

"U.S. Appl. No. 14/010,391, Reply Brief filed Jan. 9, 2017", 6 pgs.

"U.S. Appl. No. 14/010,391, Response filed Jul. 22, 2015 to Non Final Office Action dated Mar. 23, 2015", 10 pgs.

"U.S. Appl. No. 14/010,400, Appeal Brief filed Aug. 8, 2016", 17 pgs.

"U.S. Appl. No. 14/010,400, Appeal Decision mailed Nov. 3, 2017", 16 pgs.

"U.S. Appl. No. 14/010,400, Examiners Answer dated Nov. 9, 2016", 9 pgs.

"U.S. Appl. No. 14/010,400, Final Office Action dated Sep. 10, 2015", 9 pgs.

"U.S. Appl. No. 14/010,400, Non Final Office Action dated Apr. 22, 2015", 11 pgs.

"U.S. Appl. No. 14/010,400, Response filed Jul. 22, 2015 to Non Final Office Action dated Apr. 22, 2015", 10 pgs.

"U.S. Appl. No. 14/616,903, Examiners Answer dated Nov. 9, 2016", 9 pgs.

"U.S. Appl. No. 14/483,903, Appeal Brief filed Oct. 11, 2016", 21 pgs.

"U.S. Appl. No. 14/483,903, Appeal Decision mailed Sep. 25, 2017", 18 pgs.

"U.S. Appl. No. 14/483,903, Final Office Action dated Feb. 10, 2016", 11 pgs.

"U.S. Appl. No. 14/483,903, Non Final Office Action dated Sep. 1, 2015", 10 pgs.

"U.S. Appl. No. 14/483,903, Reply Brief filed Jan. 9, 2017", 6 pgs.

"U.S. Appl. No. 16/274,228, Response filed Jan. 4, 2016 to Non Final Office Action dated Sep. 1, 2015", 11 pgs.

"U.S. Appl. No. 16/274,228, Non Final Office Action dated Feb. 21, 2020", 8 pgs.

"U.S. Appl. No. 16/274,228, Notice of Allowance dated Jun. 12, 2020", 7 pgs.

"U.S. Appl. No. 16/274,228, Preliminary Amendment filed Sep. 5, 2019", 8 pgs.

"U.S. Appl. No. 16/274,228, Response filed May 20, 2020 to Non Final Office Action dated Feb. 21, 2020", 10 pgs.

"Claim Master Software User Guide", Claim Master Software LLP, (2009), 1-30.

"ClaimMaster Software User Guide", ClaimMaster Software LLP, (2009), 36 pgs.

"Patentoptimizer", LexisNexis, (2009), 2 pgs.

"U.S. Appl. No. 10/710,656, Non Final Office Action dated Jan. 17, 2007", 16 pgs.

"U.S. Appl. No. 10/710,656, Response filed Nov. 13, 2006 to Restriction Requirement dated Oct. 13, 2006", 6 pgs.

"U.S. Appl. No. 10/710,656, Restriction Requirement dated Oct. 13, 2006", 9 pgs.

"U.S. Appl. No. 10/915,265, Final Office Action dated Jul. 10, 2007", 26 pgs.

"U.S. Appl. No. 10/915,265, Final Office Action dated Jul. 14, 2008", 23 pgs.

"U.S. Appl. No. 10/915,265, Non-Final Office Action dated Apr. 13, 2009", 27 pgs.

"U.S. Appl. No. 10/915,265, Non-Final Office Action dated Jun. 2, 2010", 29 pgs.

"U.S. Appl. No. 10/915,265, Non-Final Office Action dated Nov. 5, 2008", 27 pgs.

"U.S. Appl. No. 10/915,265, Non-Final Office Action dated Dec. 28, 2007", 25 pgs.

"U.S. Appl. No. 10/915,265, Response filed Feb. 5, 2009 to Non-Final Office Action dated Nov. 5, 2008", 11 pgs.

"U.S. Appl. No. 10/915,265, Response filed Apr. 28, 2008 to Non-Final Office Action dated Dec. 28, 2007", 14 pgs.

"U.S. Appl. No. 10/915,265, Response filed Jul. 18, 2008 to Final Office Action dated Jul. 14, 2008", 17 pgs.

"U.S. Appl. No. 10/915,265, Response filed Sep. 1, 2010 to Non Final Office Action dated Jun. 2, 2010", 12 pgs.

"U.S. Appl. No. 10/915,265, Response filed Oct. 10, 2007 to Final Office Action filed Jul. 10, 2007", 15 pgs.

"U.S. Appl. No. 11/494,278, Final Office Action dated Mar. 23, 2009", 21 pgs.

"U.S. Appl. No. 11/494,278, Final Office Action dated Apr. 1, 2010", 20 pgs.

"U.S. Appl. No. 11/494,278, Non Final Office Action dated Oct. 8, 2009", 21 pgs.

"U.S. Appl. No. 11/494,278, Non-Final Office Action dated Mar. 5, 2008", 14 pgs.

"U.S. Appl. No. 11/494,278, Notice of Allowance dated May 3, 2011", 12 pgs.

"U.S. Appl. No. 11/494,278, Notice of Allowance dated Dec. 15, 2011", 14 pgs.

"U.S. Appl. No. 11/494,278, Notice of Non-Compliant Amendment dated Jun. 7, 2010", 2 pgs.

"U.S. Appl. No. 11/494,278, Preliminary Amendment filed Oct. 30, 2007", 6 pgs.

"U.S. Appl. No. 11/494,278, Response filed Feb. 10, 2010 to Non Final Office Action dated Oct. 8, 2009", 8 pgs.

"U.S. Appl. No. 11/494,278, Response filed Jun. 2, 2010 to Final Office Action dated Apr. 1, 2010", 7 pgs.

"U.S. Appl. No. 11/494,278, Response filed Jun. 5, 2008 to Non-Final Office Action dated Mar. 5, 2008", 12 pgs.

"U.S. Appl. No. 11/494,278, Response filed Jun. 9, 2010 to Notice of Non-Compliant Amendment dated Jun. 7, 2010", 7 pgs.

"U.S. Appl. No. 11/494,278, Response filed Jun. 23, 2009 to Final Office Action dated Mar. 23, 2009", 8 pgs.

"U.S. Appl. No. 11/888,632, Amendment filed Jun. 12, 2012", 8 pgs.

"U.S. Appl. No. 11/888,632, Decision on Pre-Appeal Brief mailed Mar. 9, 2012", 2 pgs.

"U.S. Appl. No. 11/888,632, Final Office Action dated Oct. 19, 2011", 9 pgs.

"U.S. Appl. No. 11/888,632, Non Final Office Action dated Jan. 19, 2011", 12 pgs.

"U.S. Appl. No. 11/888,632, Non Final Office Action dated Jan. 24, 2014", 12 pgs.

"U.S. Appl. No. 11/888,632, Pre-Appeal Brief Request filed Feb. 21, 2012", 4 pgs.

(56) References Cited

OTHER PUBLICATIONS

"U.S. Appl. No. 11/888,632, Response filed Jun. 24, 2014 to Non Final Office Action dated Jan. 24, 2014", 9 pgs.
"U.S. Appl. No. 11/888,632, Response filed Jul. 19, 2011 to Non Final Office Action dated Jan. 19, 2011", 8 pgs.
"U.S. Appl. No. 11/888,632, Response filed Dec. 7, 2010, to Restriction Requirement dated Jul. 7, 2010", 7 pgs.
"U.S. Appl. No. 11/888,632, Restriction Requirement dated Jul. 7, 2010", 5 pgs.
"U.S. Appl. No. 12/605,030, Final Office Action dated May 21, 2012", 10 pgs.
"U.S. Appl. No. 12/605,030, Final Office Action dated Jul. 16, 2014", 16 pgs.
"U.S. Appl. No. 12/605,030, Non Final Office Action dated Oct. 7, 2011", 12 pgs.
"U.S. Appl. No. 12/605,030, Non Final Office Action dated Nov. 7, 2013", 16 pgs.
"U.S. Appl. No. 12/605,030, Response filed Feb. 7, 2012 to Non Final Office Action dated Oct. 7, 2011", 9 pgs.
"U.S. Appl. No. 12/605,030, Response Filed May 7, 2014 to Non Final Office Action dated Nov. 7, 2013", 8 pgs.
"U.S. Appl. No. 12/605,030, Response filed Oct. 22, 2012 to Final Office Action dated May 21, 2012", 8 pgs.
"U.S. Appl. No. 12/658,113, Non Final Office Action dated Feb. 28, 2011", 2 6 pgs.
"U.S. Appl. No. 12/958,113, Final Office Action dated Aug. 8, 2011", 26 pgs.
"U.S. Appl. No. 12/958,113, Response filed May 20, 2011 to Non Final Office Action dated Feb. 28, 2011", 13 pgs.
"U.S. Appl. No. 13/109,080, Response filed Mar. 28, 2013 to Final Office Action dated Nov. 5, 2012", 10 pgs.
"U.S. Appl. No. 13/253,801, Final Office Action dated Jul. 18, 2013", 39 pgs.
"U.S. Appl. No. 13/253,801, Final Office Action dated Oct. 1, 2012", 41 pgs.
"U.S. Appl. No. 13/253,801, Non Final Office Action dated Apr. 10, 2013", 37 pgs.
"U.S. Appl. No. 13/253,801, Non Final Office Action dated Aug. 2, 2012", 42 pgs.
"U.S. Appl. No. 13/253,801, Notice of Allowance dated May 16, 2014", 10 pgs.
"U.S. Appl. No. 13/253,801, Notice of Allowance dated Jul. 16, 2014", 9 pgs.
"U.S. Appl. No. 13/253,801, Preliminary Amendment filed Oct. 5, 2011", 4 pgs.
"U.S. Appl. No. 13/253,801, Response filed Mar. 20, 2013 to Final Office Action dated Oct. 1, 2012", 16 pgs.
"U.S. Appl. No. 13/253,801, Response filed Jul. 5, 2013 to Non Final Office Action dated Apr. 10, 2013", 18 pgs.
"U.S. Appl. No. 13/253,801, Response filed Sep. 7, 2012 to Non Final Office Action dated Aug. 2, 2012", 17 pgs.
"U.S. Appl. No. 13/253,801, Response filed Nov. 18, 2013 to Final Office Action dated Jul. 18, 2013", 16 pgs.
"U.S. Appl. No. 13/253,811, Appeal Decision mailed Nov. 1, 2017", 21 pgs.
"U.S. Appl. No. 13/253,811, Final Office Action dated Apr. 11, 2016", 14 pgs.
"U.S. Appl. No. 13/253,811, Final Office Action dated Jul. 2, 2013", 12 pgs.
"U.S. Appl. No. 13/253,811, Final Office Action dated Dec. 9, 2014", 13 pgs.
"U.S. Appl. No. 13/253,811, Non Final Office Action dated May 1, 2014", 13 pgs.
"U.S. Appl. No. 13/253,811, Non Final Office Action dated Jun. 18, 2015", 12 pgs.
"U.S. Appl. No. 13/253,811, Non Final Office Action dated Oct. 18, 2012", 12 pgs.
"U.S. Appl. No. 13/253,811, Preliminary Amendment filed Oct. 5, 2011", 4 pgs.
"U.S. Appl. No. 13/253,811, Response filed Jan. 2, 2014 to Final Office Action dated Jul. 2, 2013", 13 pgs.
"U.S. Appl. No. 13/253,811, Response filed Mar. 18, 2013 to Non Final Office Action dated Oct. 18, 2012", 13 pgs.
"U.S. Appl. No. 13/253,811, Response filed Apr. 9, 2015 to Final Office Action dated Dec. 9, 2014", 11 pgs.
"U.S. Appl. No. 13/253,811, Response filed Oct. 1, 2014 to Non Final Office Action dated May 1, 2014", 10 pgs.
"U.S. Appl. No. 13/253,811, Response filed Oct. 19, 2015 to Non Final Office Action dated Jun. 18, 2015", 9 pgs.
"U.S. Appl. No. 13/253,825, Examiner Interview Summary dated Aug. 13, 2013", 3 pgs.
"U.S. Appl. No. 13/253,825, Final Office Action dated Aug. 14, 2013", 35 pgs.
"U.S. Appl. No. 13/253,825, Final Office Action dated Nov. 21, 2012", 33 pgs.
"U.S. Appl. No. 13/253,825, Non Final Office Action dated Feb. 11, 2014", 45 pgs.
"U.S. Appl. No. 13/253,825, Non Final Office Action dated Apr. 25, 2013", 32 pgs.
"U.S. Appl. No. 13/253,825, Non Final Office Action dated Aug. 3, 2012", 32 pgs.
"U.S. Appl. No. 13/253,825, Notice of Allowance dated Oct. 23, 2014", 16 pgs.
"U.S. Appl. No. 13/253,825, Preliminary Amendment filed Oct. 5, 2011", 4 pgs.
"U.S. Appl. No. 13/253,825, Response filed Mar. 20, 2013 to Final Office Action dated Nov. 21, 2012", 17 pgs.
"U.S. Appl. No. 13/253,825, Response filed Jun. 11, 2014 to Non Final Office Action dated Feb. 11, 2014", 16 pgs.
"U.S. Appl. No. 13/253,825, Response filed Jul. 18, 2013 to Non Final Office Action dated Apr. 25, 2013", 16 pgs.
"U.S. Appl. No. 13/253,846, Response filed Oct. 3, 2013 to Final Office Action dated Aug. 14, 2013", 15 pgs.
"U.S. Appl. No. 13/253,846, Advisory Action dated Sep. 10, 2013", 3 pgs.
"U.S. Appl. No. 13/253,846, Decision on Pre-Appeal Brief Request mailed Dec. 26, 2013", 2 pgs.
"U.S. Appl. No. 13/253,846, Final Office Action dated Apr. 12, 2016", 22 pgs.
"U.S. Appl. No. 13/253,846, Final Office Action dated Jun. 19, 2013", 21 pgs.
"U.S. Appl. No. 13/253,846, Final Office Action dated Oct. 23, 2014", 19 pgs.
"U.S. Appl. No. 13/253,846, Non Final Office Action dated Mar. 7, 2014", 20 pgs.
"U.S. Appl. No. 13/253,846, Non Final Office Action dated Jun. 25, 2015", 19 pgs.
"U.S. Appl. No. 13/253,846, Non Final Office Action dated Oct. 29, 2012", 12 pgs.
"U.S. Appl. No. 13/253,846, Pre-Appeal Brief Request filed Oct. 21, 2013", 4 pgs.
"U.S. Appl. No. 13/253,846, Response filed Jan. 23, 2015 to Final Office Action dated Oct. 23, 2014", 15 pgs.
"U.S. Appl. No. 13/253,846, Response filed Mar. 26, 2013 to Non Final Office Action dated Oct. 29, 2012", 17 pgs.
"U.S. Appl. No. 13/253,846, Response filed Aug. 16, 2013 to Final Office Action dated Jun. 19, 2013", 16 pgs.
"U.S. Appl. No. 13/253,846, Response filed Oct. 26, 2015 to Non Final Office Action dated Jun. 25, 2015", 14 pgs.
"U.S. Appl. No. 13/253,931, Advisory Action dated Sep. 11, 2013", 3 pgs.
"U.S. Appl. No. 13/253,931, Examiner Interview Summary dated Sep. 12, 2013", 2 pgs.
"U.S. Appl. No. 13/253,931, Final Office Action dated Jun. 20, 2013", 11 pgs.
"U.S. Appl. No. 13/253,931, Final Office Action dated Dec. 3, 2014", 11 pgs.
"U.S. Appl. No. 13/253,931, Non Final Office Action dated Apr. 18, 2014", 11 pgs.
"U.S. Appl. No. 13/253,931, Non Final Office Action dated Nov. 28, 2012", 13 pgs.

(56) References Cited

OTHER PUBLICATIONS

"U.S. Appl. No. 13/253,931, Response filed Mar. 26, 2013 to Non Final Office Action dated Nov. 28, 2012", 13 pgs.
"U.S. Appl. No. 13/253,931, Response filed Aug. 16, 2013 to Final Office Action dated Jun. 20, 2013", 14 pgs.
"U.S. Appl. No. 13/253,931, Response filed Sep. 18, 2014 to Non Final Office Action dated Apr. 18, 2014", 9 pgs.
"U.S. Appl. No. 13/253,931, Response filed Sep. 20, 2013 to Final Office Action dated Jun. 20, 2013", 13 pgs.
"U.S. Appl. No. 13/253,936, Appeal Brief filed Jan. 8, 2016", 10 pgs.
"U.S. Appl. No. 13/253,936, Appeal Brief filed Jun. 8, 2015", 13 pgs.
"U.S. Appl. No. 13/253,936, Appeal Decision mailed Aug. 3, 2017", 10 pgs.
"U.S. Appl. No. 13/253,936, Examiner's Answer to Appeal Brief mailed Jun. 23, 2016", 6 ogs.
"U.S. Appl. No. 13/253,936, Final Office Action dated Feb. 4, 2015", 14 pgs.
"U.S. Appl. No. 13/253,936, Final Office Action dated Jun. 24, 2013", 13 pgs.
"U.S. Appl. No. 13/253,936, Non Final Office Action dated Jun. 18, 2014", 14 pgs.
"U.S. Appl. No. 13/253,936, Non Final Office Action dated Oct. 8, 2015", 15 pgs.
"U.S. Appl. No. 13/253,936, Non Final Office Action dated Nov. 28, 2012", 11 pgs.
"U.S. Appl. No. 13/253,936, Reply Brief filed Aug. 23, 2016", 4 pgs.
"U.S. Appl. No. 13/253,936, Response filed Mar. 27, 2013 to Non Final Office Action dated Nov. 28, 2012", 11 pgs.
"U.S. Appl. No. 13/253,936, Response filed Oct. 3, 2017 to Appeal Decision mailed Aug. 3, 2017", 8 pgs.
"U.S. Appl. No. 13/253,936, Response filed Dec. 16, 2014 to Non Final Office Action dated Jun. 18, 2014", 9 pgs.
"U.S. Appl. No. 13/253,936, Response filed Dec. 23, 2013 to Final Office Action dated Jun. 24, 2013", 5 pgs.
"U.S. Appl. No. 13/253,941, Final Office Action dated Jun. 6, 2013", 16 pgs.
"U.S. Appl. No. 13/253,941, Final Office Action dated Dec. 26, 2014", 18 pgs.
"U.S. Appl. No. 13/253,941, Non Final Office Action dated May 7, 2014", 18 pgs.
"U.S. Appl. No. 13/253,941, Non Final Office Action dated Nov. 15, 2012", 14 pgs.
"U.S. Appl. No. 13/253,941, Response filed Apr. 15, 2013 to Non Final Office Action dated Nov. 15, 2012", 13 pgs.
"U.S. Appl. No. 13/253,941, Response filed Nov. 6, 2013 to Final Office Action dated Jun. 6, 2013", 11 pgs.
"U.S. Appl. No. 13/253,941, Response filed Nov. 7, 2014 to Non Final Office Action dated May 7, 2014", 10 pgs.
"U.S. Appl. No. 13/253,846, Response filed Aug. 6, 2014 to Non Final Office Action dated Mar. 7, 2014", 14 pgs.
"U.S. Appl. No. 13/255,825, Response filed Oct. 30, 2012 to Non Final Office Action dated Aug. 3, 2012", 18 pgs.
"U.S. Appl. No. 13/275,707, Appeal Brief filed May 26, 2015", 37 pgs.
"U.S. Appl. No. 13/275,707, Examiner Interview Summary dated Apr. 8, 2015", 3 pgs.
"U.S. Appl. No. 13/275,707, Examiner Interview Summary dated Jul. 29, 2013", 3 pgs.
"U.S. Appl. No. 13/275,707, Examiner Interview Summary dated Nov. 28, 2014", 2 pgs.
"U.S. Appl. No. 13/275,707, Final Office Action dated Jul. 30, 2013", 90 pgs.
"U.S. Appl. No. 13/275,707, Final Office Action dated Nov. 28, 2014", 57 pgs.
"U.S. Appl. No. 13/275,707, Non Final Office Action dated Apr. 30, 2014", 94 pgs.
"U.S. Appl. No. 13/275,707, Non Final Office Action dated Dec. 12, 2012", 39 pgs.
"U.S. Appl. No. 13/275,707, Notice of Allowance dated Jul. 27, 2015", 19 pgs.
"U.S. Appl. No. 13/275,707, Response filed Jan. 30, 2014 to Final Office Action dated Jul. 30, 2013", 14 pgs.
"U.S. Appl. No. 13/275,707, Response filed Apr. 9, 2013 to Non Final Office Action dated Dec. 12, 2012", 14 pgs.
"U.S. Appl. No. 13/275,707, Response filed Aug. 28, 2014 to Non Final Office Action dated Apr. 30, 2014", 11 pgs.
"U.S. Appl. No. 13/309,039, Advisory Action dated Apr. 16, 2013", 3 pgs.
"U.S. Appl. No. 13/309,039, Appeal Brief filed Jul. 5, 2013", 18 pgs.
"U.S. Appl. No. 13/309,039, Appeal Brief filed Sep. 3, 2014", 20 pgs.
"U.S. Appl. No. 13/309,039, Appeal Decision mailed Sep. 23, 2016", 10 pgs.
"U.S. Appl. No. 13/309,039, Decision on Pre-Appeal Brief Request mailed Jun. 7, 2013", 2 pgs.
"U.S. Appl. No. 13/309,039, Examiner Interview Summary dated Oct. 23, 2012", 3 pgs.
"U.S. Appl. No. 13/309,039, Examiner's Answer to Appeal Brief mailed Nov. 14, 2014", 11 pgs.
"U.S. Appl. No. 13/309,039, Final Office Action dated Jan. 2, 2013", 11 pgs.
"U.S. Appl. No. 13/309,039, Non Final Office Action dated Sep. 11, 2012", 9 pgs.
"U.S. Appl. No. 13/309,039, Non Final Office Action dated Sep. 11, 2013", 13 pgs.
"U.S. Appl. No. 13/309,039, Pre-Appeal Brief Request filed May 6, 2013", 5 pgs.
"U.S. Appl. No. 13/309,039, Response filed Jan. 14, 2015 to Examiner's Answer to Appeal Brief mailed Nov. 14, 2014", 8 pgs.
"U.S. Appl. No. 13/309,039, Response filed Apr. 1, 2013 to Final Office Action dated Jan. 2, 2013", 13 pgs.
"U.S. Appl. No. 13/309,039, Response filed Oct. 22, 2012 to Non Final Office Action dated Sep. 11, 2012", 13 pgs.
"U.S. Appl. No. 13/309,060, Advisory Action dated Apr. 18, 2014", 3 pgs.
"U.S. Appl. No. 13/309,060, Appeal Brief filed Apr. 21, 2015", 16 pgs.
"U.S. Appl. No. 13/309,060, Appeal Decision mailed Aug. 25, 2017", 9 pgs.
"U.S. Appl. No. 13/309,060, Final Office Action dated Oct. 11, 2013", 13 pgs.
"U.S. Appl. No. 13/309,060, Final Office Action dated Nov. 28, 2014", 13 pgs.
"U.S. Appl. No. 13/309,060, Final Office Action dated Dec. 7, 2012", 10 pgs.
"U.S. Appl. No. 13/309,060, Non Final Office Action dated May 30, 2013", 11 pgs.
"U.S. Appl. No. 13/309,060, Non Final Office Action dated Jun. 17, 2014", 12 pgs.
"U.S. Appl. No. 13/309,060, Non Final Office Action dated Aug. 1, 2012", 8 pgs.
"U.S. Appl. No. 13/309,060, Notice of Allowance dated Nov. 27, 2017", 7 pgs.
"U.S. Appl. No. 13/309,060, Response filed Mar. 4, 2014 to Final Office Action dated Dec. 24, 2013", 11 pgs.
"U.S. Appl. No. 13/309,060, Response filed Apr. 8, 2013 to Final Office Action dated Dec. 7, 2012", 10 pgs.
"U.S. Appl. No. 13/309,060, Response filed Aug. 15, 2013 to Non Final Office Action dated May 30, 2013", 10 pgs.
"U.S. Appl. No. 13/309,060, Response filed Sep. 20, 2012 to Non Final Office Action dated Aug. 1, 2012", 8 pgs.
"U.S. Appl. No. 13/309,060, Response filed Nov. 17, 2014 to Non Final Office Action dated Jun. 17, 2014", 6 pgs.
"U.S. Appl. No. 13/309,080, Appeal Brief filed May 20, 2014", 12 pgs.
"U.S. Appl. No. 13/309,080, Appeal Decision mailed May 27, 2016", 8 pgs.

(56) References Cited

OTHER PUBLICATIONS

"U.S. Appl. No. 13/309,080, Examiner Interview Summary dated Sep. 5, 2012", 3 pgs.
"U.S. Appl. No. 13/309,080, Examiner Interview Summary dated Dec. 17, 2012", 3 pgs.
"U.S. Appl. No. 13/309,080, Final Office Action dated Oct. 11, 2013", 11 pgs.
"U.S. Appl. No. 13/309,080, Final Office Action dated Nov. 5, 2012", 8 pgs.
"U.S. Appl. No. 13/309,080, Non Final Office Action dated Jun. 10, 2013", 12 pgs.
"U.S. Appl. No. 13/309,080, Non Final Office Action dated Jul. 30, 2012", 8 pgs.
"U.S. Appl. No. 13/309,080, Notice of Non-Compliant Appeal Brief mailed Jun. 3, 2014", 2 pgs.
"U.S. Appl. No. 13/309,080, Notice of Panel Decision from Pre-Appeal Brief Review mailed May 1, 2014", 2 pgs.
"U.S. Appl. No. 13/309,080, Pre-Appeal Brief Request for Review filed Mar. 4, 2014", 5 pgs.
"U.S. Appl. No. 13/309,080, Response filed Aug. 15, 2013 to Non Final Office Action dated Jun. 10, 2013", 14 pgs.
"U.S. Appl. No. 13/309,080, Response filed Aug. 29, 2012 to Non Final Office Action dated Jul. 30, 2012", 11 pgs.
"U.S. Appl. No. 13/309,080, Response filed Sep. 30, 2014 to Examiner's Answer to Appeal Brief mailed Aug. 1, 2014", 5 pgs.
"U.S. Appl. No. 13/309,080, Examiner's Answer to Appeal Brief mailed Aug. 1, 2014", 7 pgs.
"U.S. Appl. No. 13/309,102, Appeal Brief filed Jun. 5, 2014", 19 pgs.
"U.S. Appl. No. 13/309,102, Appeal Decision mailed Jun. 1, 2016", 13 pgs.
"U.S. Appl. No. 13/309,102, Decision on Pre-Appeal Brief Request mailed May 1, 2014", 2 pgs.
"U.S. Appl. No. 13/309,102, Examiner's Answer to Appeal Brief mailed Jul. 31, 2014", 6 pgs.
"U.S. Appl. No. 13/309,102, Final Office Action dated Nov. 27, 2013", 12 pgs.
"U.S. Appl. No. 13/309,102, Final Office Action dated Dec. 10, 2012", 10 pgs.
"U.S. Appl. No. 13/309,102, Non Final Office Action dated May 30, 2013", 13 pgs.
"U.S. Appl. No. 13/309,102, Non Final Office Action dated Aug. 6, 2012", 7 pgs.
"U.S. Appl. No. 13/309,102, Pre-Appeal Brief Request filed Mar. 26, 2014", 5 pgs.
"U.S. Appl. No. 13/309,102, Response filed Apr. 9, 2013 to Final Office Action dated Dec. 10, 2012", 13 pgs.
"U.S. Appl. No. 13/309,102, Response filed Sep. 5, 2013 to Non Final Office Action dated May 30, 2013", 13 pgs.
"U.S. Appl. No. 13/309,102, Response filed Sep. 25, 2012 to Non Final Office Action dated Aug. 6, 2012", 10 pgs.
"U.S. Appl. No. 13/309,102, Response filed Sep. 30, 2014 to Examiner's Answer to Appeal Brief mailed Jul. 31, 2014", 4 pgs.
"U.S. Appl. No. 13/309,127, Appeal Brief filed Apr. 30, 2014", 19 pgs.
"U.S. Appl. No. 13/309,127, Appeal Decision mailed Jul. 26, 2017", 16 pgs.
"U.S. Appl. No. 13/309,127, Final Office Action dated Oct. 10, 2012", 18 pgs.
"U.S. Appl. No. 13/309,127, Final Office Action dated Oct. 22, 2013", 19 pgs.
"U.S. Appl. No. 13/309,127, Non Final Office Action dated Apr. 25, 2013", 19 pgs.
"U.S. Appl. No. 13/309,127, Non Final Office Action dated Jun. 25, 2012", 15 pgs.
"U.S. Appl. No. 13/309,127, Pre-Appeal Brief Request filed Feb. 28, 2014", 5 pgs.
"U.S. Appl. No. 13/309,127, Response filed Mar. 25, 2013 to Final Office Action dated Oct. 10, 2012", 13 pgs.
"U.S. Appl. No. 13/309,127, Response filed Jul. 24, 2013 to Non Final Office Action dated Apr. 25, 2013", 11 pgs.
"U.S. Appl. No. 13/309,127, Response filed Aug. 1, 2012 to Non Final Office Action dated Jun. 25, 2012", 15 pgs.
"U.S. Appl. No. 13/309,127, Response filed Sep. 30, 2014 to Examiner's Answer to Appeal Brief mailed Jul. 31, 2014", 6 pgs.
"U.S. Appl. No. 13/309,127, Examiner's Answer to Appeal Brief mailed Jul. 31, 2014", 9 pgs.
"U.S. Appl. No. 13/309,146, Advisory Action dated Feb. 12, 2015", 3 pgs.
"U.S. Appl. No. 13/309,146, Appeal Brief filed Jan. 12, 2015", 10 pgs.
"U.S. Appl. No. 13/309,146, Appeal Decision mailed Jun. 1, 2016", 10 pgs.
"U.S. Appl. No. 13/309,146, Final Office Action dated Jun. 27, 2014", 14 pgs.
"U.S. Appl. No. 13/309,146, Non Final Office Action dated Dec. 19, 2013", 10 pgs.
"U.S. Appl. No. 13/309,146, Response filed Apr. 24, 2014 to Non Final Office Action dated Dec. 19, 2013", 10 pgs.
"U.S. Appl. No. 13/309,200, Appeal Brief Filed Jun. 8, 2015", 17 pgs.
"U.S. Appl. No. 13/309,200, Appeal Decision mailed Aug. 28, 2017", 12 pgs.
"U.S. Appl. No. 13/309,200, Final Office Action dated Jan. 8, 2015", 14 pgs.
"U.S. Appl. No. 13/309,200, Final Office Action dated Jan. 14, 2014", 15 pgs.
"U.S. Appl. No. 13/309,200, Non Final Office Action dated Jul. 2, 2013", 14 pgs.
"U.S. Appl. No. 13/309,200, Non Final Office Action dated Sep. 10, 2012", 12 pgs.
"U.S. Appl. No. 13/309,200, Non Final Office Action dated Sep. 24, 2014", 14 pgs.
"U.S. Appl. No. 13/309,200, Non Final Office Action dated Dec. 4, 2017", 17 pgs.
"U.S. Appl. No. 13/309,200, Preliminary Amendment filed Dec. 8, 2011", 8 pgs.
"U.S. Appl. No. 13/309,200, Response filed Jan. 2, 2014 to Non Final Office Action dated Jul. 2, 2013", 12 pgs.
"U.S. Appl. No. 13/309,200, Response filed Mar. 11, 2013 to Non Final Office Action dated Sep. 10, 2012", 13 pgs.
"U.S. Appl. No. 13/309,200, Response filed Jul. 10, 2014 to Final Office Action dated Jan. 14, 2014", 13 pgs.
"U.S. Appl. No. 13/309,200, Response filed Oct. 30, 2017 to Final Office Action dated Jan. 8, 2017", 12 pgs.
"U.S. Appl. No. 13/309,200, Response filed Dec. 23, 2014 to Non Final Office Action dated Sep. 24, 2014", 9 pgs.
"U.S. Appl. No. 13/310,279, Appeal Brief filed Nov. 3, 2014", 19 pgs.
"U.S. Appl. No. 13/310,279, Appeal Decision mailed Aug. 30, 2017", 9 pgs.
"U.S. Appl. No. 13/310,279, Examiner Interview Summary dated Nov. 19, 2013", 3 pgs.
"U.S. Appl. No. 13/310,279, Final Office Action dated Dec. 3, 2013", 14 pgs.
"U.S. Appl. No. 13/310,279, Non Final Office Action dated Jun. 17, 2013", 12 pgs.
"U.S. Appl. No. 13/310,279, Pre-Appeal Brief Request filed Apr. 3, 2014", 5 pgs.
"U.S. Appl. No. 13/310,279, Reply Brief dated Jan. 4, 2016 to Appeal Brief filed Nov. 3, 2014", 3 pgs.
"U.S. Appl. No. 13/310,279, Response filed Sep. 13, 2013 to Non Final Office Action dated Jun. 17, 2013", 15 pgs.
"U.S. Appl. No. 13/310,279, Response filed Oct. 30, 2017 to Non Final Office Action dated Dec. 3, 2017", 8 pgs.
"U.S. Appl. No. 13/310,322, Appeal Brief filed Jan. 15, 2015", 17 pgs.
"U.S. Appl. No. 13/310,322, Appeal Decision mailed Sep. 20, 2017", 18 pgs.
"U.S. Appl. No. 13/310,322, Decision on Pre-Appeal Brief Request mailed Sep. 15, 2015", 2 pgs.

(56) References Cited

OTHER PUBLICATIONS

"U.S. Appl. No. 13/310,322, Final Office Action dated Feb. 13, 2014", 15 pgs.
"U.S. Appl. No. 13/310,322, Final Office Action dated Mar. 31, 2015", 16 pgs.
"U.S. Appl. No. 13/310,322, Non Final Office Action dated Jul. 2, 2013", 16 pgs.
"U.S. Appl. No. 13/310,322, Non Final Office Action dated Oct. 3, 2014", 16 pgs.
"U.S. Appl. No. 13/310,322, Pre-Appeal Brief Request filed Jul. 31, 2015", 5 pgs.
"U.S. Appl. No. 13/310,322, Reply Brief filed Aug. 15, 2016", 4 pgs.
"U.S. Appl. No. 13/310,322, Response filed Jan. 5, 2015 to Non Final Office Action dated Oct. 3, 2014", 12 pgs.
"U.S. Appl. No. 13/310,322, Response filed Nov. 1, 2013 to Non Final Office Action dated Jul. 2, 2013", 12 pgs.
"U.S. Appl. No. 13/310,332, Response filed Jul. 14, 2014 to Final Office Action dated Feb. 13, 2014", 12 pgs.
"U.S. Appl. No. 13/310,368, Advisory Action dated Jun. 9, 2015", 3 pgs.
"U.S. Appl. No. 13/310,368, Advisory Action dated Jul. 8, 2015", 2 pgs.
"U.S. Appl. No. 13/310,368, Advisory Action dated Aug. 21, 2015", 2 pgs.
"U.S. Appl. No. 13/310,368, Appeal Brief filed Aug. 17, 2015", 27 pgs.
"U.S. Appl. No. 13/310,368, Appeal Decision mailed Aug. 30, 2017", 11 pgs.
"U.S. Appl. No. 13/310,368, Final Office Action dated Jan. 7, 2014", 17 pgs.
"U.S. Appl. No. 13/310,368, Final Office Action dated Mar. 18, 2015", 15 pgs.
"U.S. Appl. No. 13/310,368, Non Final Office Action dated Jun. 17, 2013", 17 pgs.
"U.S. Appl. No. 13/310,368, Non Final Office Action dated Sep. 12, 2014", 19 pgs.
"U.S. Appl. No. 13/310,368, Non Final Office Action dated Dec. 1, 2017", 17 pgs.
"U.S. Appl. No. 13/310,368, Response filed May 18, 2015 to Final Office Action dated Mar. 18, 2015", 11 pgs.
"U.S. Appl. No. 13/310,368, Response filed Jul. 7, 2014 to Final Office Action dated Jan. 7, 2014", 12 pgs.
"U.S. Appl. No. 13/310,368, Response filed Sep. 17, 2013 to Non Final Office Action dated Jun. 17, 2013", 15 pgs.
"U.S. Appl. No. 13/310,368, Response filed Oct. 30, 2017 to Final Office Action dated Mar. 18, 2015", 8 pgs.
"U.S. Appl. No. 13/310,368, Response filed Dec. 12, 2014 to Non Final Office Action dated Sep. 12, 2014", 9 pgs.
"U.S. Appl. No. 13/310,417, Appeal Brief filed Sep. 11, 2015", 19 pgs.
"U.S. Appl. No. 13/310,417, Final Office Action dated Jan. 9, 2014", 17 pgs.
"U.S. Appl. No. 13/310,417, Final Office Action dated Mar. 11, 2015", 17 pgs.
"U.S. Appl. No. 13/310,417, Non Final Office Action dated Feb. 11, 2016", 12 pgs.
"U.S. Appl. No. 13/310,411, Non Final Office Action dated Jun. 17, 2013", 13 pgs.
"U.S. Appl. No. 13/310,411, Non Final Office Action dated Sep. 8, 2014", 17 pgs.
"U.S. Appl. No. 13/310,411, Response filed May 27, 2014 to Final Office Action dated Jan. 9, 2014", 14 pgs.
"U.S. Appl. No. 13/310,417, Response filed May 27, 2014 to Final Office Action dated Jan. 9, 2014", 14 pgs.
"U.S. Appl. No. 13/310,417, Response filed Sep. 17, 2013 to Non Final Office Action dated Jun. 17, 2013", 14 pgs.
"U.S. Appl. No. 13/310,452, Advisory Action dated Jul. 17, 2014", 3 pgs.
"U.S. Appl. No. 13/310,452, Appeal Brief filed Oct. 17, 2016", 25 pgs.
"U.S. Appl. No. 13/310,452, Appeal Decision mailed Sep. 29, 2017", 20 pgs.
"U.S. Appl. No. 13/310,452, Decision on Pre-Appeal Brief mailed Apr. 17, 2015", 2 pgs.
"U.S. Appl. No. 13/310,452, Final Office Action dated May 1, 2014", 18 pgs.
"U.S. Appl. No. 13/310,452, Final Office Action dated Dec. 15, 2015", 21 pgs.
"U.S. Appl. No. 13/310,452, Non Final Office Action dated May 4, 2015", 17 pgs.
"U.S. Appl. No. 13/310,452, Non Final Office Action dated Jul. 10, 2013", 14 pgs.
"U.S. Appl. No. 13/310,452, Non Final Office Action dated Oct. 6, 2014", 18 pgs.
"U.S. Appl. No. 13/310,452, Pre-Appeal Brief Request filed Mar. 5, 2015", 5 pgs.
"U.S. Appl. No. 13/310,452, Response filed Jan. 10, 2014 to Non Final Office Action dated Jul. 10, 2013", 11 pgs.
"U.S. Appl. No. 13/310,452, Response filed Jul. 1, 2014 to Final Office Action dated May 1, 2014", 11 pgs.
"U.S. Appl. No. 13/310,452, Response filed Sep. 3, 2015 to Non Final Office Action dated May 4, 2015", 14 pgs.
"U.S. Appl. No. 13/312,507, Final Office Action dated Nov. 21, 2014", 12 pgs.
"U.S. Appl. No. 13/312,507, Non Final Office Action dated Mar. 26, 2015", 13 pgs.
"U.S. Appl. No. 13/312,507, Non Final Office Action dated May 27, 2014", 13 pgs.
"U.S. Appl. No. 13/312,507, Notice of Allowance dated Oct. 30, 2015", 19 pgs.
"U.S. Appl. No. 13/312,507, PTO Response to Rule 312 Communication dated Feb. 16, 2016", 2 pgs.
"U.S. Appl. No. 13/312,507, Response filed Feb. 19, 2015 to Final Office Action dated Nov. 21, 2014", 10 pgs.
"U.S. Appl. No. 13/312,507, Response filed Jul. 27, 2015 to Non Final Office Action dated Mar. 26, 2015", 11 pgs.
"U.S. Appl. No. 13/312,507, Response filed Oct. 27, 2014 to Non Final Office Action dated May 27, 2014", 10 pgs.
"U.S. Appl. No. 13/351,533, Final Office Action dated Jan. 23, 2013", 33 pgs.
"U.S. Appl. No. 13/351,533, Final Office Action dated Mar. 20, 2015", 28 pgs.
"U.S. Appl. No. 13/351,533, Non Final Office Action dated Feb. 4, 2014", 26 pgs.
"U.S. Appl. No. 13/351,533, Non Final Office Action dated May 25, 2012", 20 pgs.
"U.S. Appl. No. 13/351,533, Non Final Office Action dated Sep. 6, 2012", 26 pgs.
"U.S. Appl. No. 13/351,533, Non Final Office Action dated Oct. 14, 2014", 25 pgs.
"U.S. Appl. No. 13/351,533, Response filed Jan. 14, 2015 to Non Final Office Action dated Oct. 14, 2014", 18 pgs.
"U.S. Appl. No. 13/351,533, Response filed Apr. 10, 2013 to Final Office Action dated Jan. 23, 2013", 12 pgs.
"U.S. Appl. No. 13/351,533, Response Filed Jun. 3, 2014 to Non Final Office Action dated Feb. 4, 2014", 14 pgs.
"U.S. Appl. No. 13/351,533, Response filed Jun. 8, 2012 to Non Final Office Action dated May 25, 2012", 12 pgs.
"U.S. Appl. No. 13/351,533, Response filed Nov. 20, 2012 to Non Final Office Action dated Sep. 6, 2012", 14 pgs.
"U.S. Appl. No. 13/365,062, Non Final Office Action dated Apr. 30, 2014", 13 pgs.
"U.S. Appl. No. 13/365,062, Non Final Office Action dated Aug. 19, 2013", 14 pgs.
"U.S. Appl. No. 13/365,062, Non Final Office Action dated Nov. 30, 2012", 19 pgs.
"U.S. Appl. No. 13/365,062, Non-Final Office Action dated Jul. 3, 2012", 20 pgs.
"U.S. Appl. No. 13/365,062, Response filed May 29, 2013 to Non Final Office Action dated Nov. 30, 2012", 8 pgs.

(56) References Cited

OTHER PUBLICATIONS

"U.S. Appl. No. 13/365,062, Response filed Oct. 3, 2012 to Non Final Office Action dated Jul. 3, 2012", 8 pgs.
"U.S. Appl. No. 13/365,062, Response filed Dec. 19, 2013 to Non Final Office Action dated Aug. 19, 2013", 10 pgs.
"U.S. Appl. No. 13/408,877, Appeal Brief filed Nov. 10, 2015", 14 [gs/.
"U.S. Appl. No. 13/408,877, Appeal Decision mailed Sep. 6, 2017", 23 pgs.
"U.S. Appl. No. 13/408,877, Final Office Action dated May 8, 2015", 24 pgs.
"U.S. Appl. No. 13/408,877, Final Office Action dated Sep. 3, 2013", 27 pgs.
"U.S. Appl. No. 13/408,877, Non Final Office Action dated Feb. 28, 2013", 22 pgs.
"U.S. Appl. No. 13/408,877, Non Final Office Action dated Oct. 8, 2014", 26 pgs.
"U.S. Appl. No. 13/408,877, Response filed Jan. 8, 2015 to Non Final Office Action dated Oct. 8, 2014", 15 pgs.
"U.S. Appl. No. 13/408,877, Response filed May 16, 2013 to Non Final Office Action dated Feb. 28, 2013", 17 pgs.
"U.S. Appl. No. 13/408,877, Response filed Dec. 3, 2013 to Final Office Action dated Sep. 3, 2013", 18 pgs.
"U.S. Appl. No. 13/408,917, Appeal Brief filed Jan. 19, 2016", 18 pgs.
"U.S. Appl. No. 13/408,917, Appeal Decision mailed Sep. 12, 2017", 19 pgs.
"U.S. Appl. No. 13/408,917, Decision on Pre-Appeal Brief Request mailed Sep. 17, 2015", 2 pgs.
"U.S. Appl. No. 13/408,917, Examiner Interview Summary dated Aug. 28, 2013", 3 pgs.
"U.S. Appl. No. 13/408,917, Final Office Action dated May 11, 2015", 23 pgs.
"U.S. Appl. No. 13/408,917, Final Office Action dated Aug. 28, 2013", 24 pgs.
"U.S. Appl. No. 13/408,917, Non Final Office Action dated Mar. 5, 2013", 18 pgs.
"U.S. Appl. No. 13/408,917, Non Final Office Action dated Oct. 9, 2014", 24 pgs.
"U.S. Appl. No. 13/408,917, Pre-Appeal Brief Request filed Aug. 12, 2015", 5 pgs.
"U.S. Appl. No. 13/408,917, Reply Brief filed Oct. 3, 2016", 4 pgs.
"U.S. Appl. No. 13/408,917, Response filed Jan. 9, 2015 to Non Final Office Action dated Oct. 9, 2014", 13 pgs.
"U.S. Appl. No. 13/408,917, Response filed Jun. 3, 2013 to Non Final Office Action dated Mar. 5, 2013", 16 pgs.
"U.S. Appl. No. 13/408,917, Response filed Nov. 27, 2013 to Final Office Action dated Aug. 28, 2013", 17 pgs.
"U.S. Appl. No. 13/409,189 Examiner's Answer dated Jan. 4, 2017", 12 pgs.
"U.S. Appl. No. 13/409,189, Appeal Brief filed Oct. 25, 2016", 30 pgs.
"U.S. Appl. No. 13/409,189, Appeal Decision mailed Dec. 18, 2017", 14 pgs.
"U.S. Appl. No. 13/409,189, Examiner Interview Summary dated Aug. 30, 2013", 3 pgs.
"U.S. Appl. No. 13/409,189, Final Office Action dated May 8, 2015", 23 pgs.
"U.S. Appl. No. 13/409,189, Final Office Action dated Aug. 28, 2013", 22 pgs.
"U.S. Appl. No. 13/409,189, Non Final Office Action dated Feb. 28, 2013", 20 pgs.
"U.S. Appl. No. 13/409,189, Non Final Office Action dated Oct. 9, 2014", 23 pgs.
"U.S. Appl. No. 13/409,189, Non Final Office Action dated Dec. 23, 2015", 12 pgs.
"U.S. Appl. No. 13/409,189, Response filed Jan. 9, 2015 to Non Final Office Action dated Oct. 9, 2014", 13 pgs.
"U.S. Appl. No. 13/409,189, Response filed May 28, 2013 to Non Final Office Action dated Feb. 28, 2013", 16 pgs.
"U.S. Appl. No. 13/409,189, Response filed Sep. 8, 2005 to Final Office Action dated May 8, 2015", 16 pgs.
"U.S. Appl. No. 13/409,189, Response filed Nov. 27, 2013 to Final Office Action dated Aug. 28, 2013", 15 pgs.
"U.S. Appl. No. 13/422,750, Final Office Action dated Jun. 15, 2016", 37 pgs.
"U.S. Appl. No. 13/422,750, Final Office Action dated Aug. 7, 2013", 29 pgs.
"U.S. Appl. No. 13/422,750, Non Final Office Action dated Apr. 1, 2014", 32 pgs.
"U.S. Appl. No. 13/422,750, Non Final Office Action dated Apr. 12, 2013", 19 pgs.
"U.S. Appl. No. 13/422,750, Non Final Office Action dated Oct. 31, 2014", 32 pgs.
"U.S. Appl. No. 13/422,750, Response filed Jan. 30, 2014 to Final Office Action dated Aug. 7, 2013", 13 pgs.
"U.S. Appl. No. 13/422,750, Response filed Feb. 2, 2015 to Non Final Office Action dated Oct. 31, 2014", 11 pgs.
"U.S. Appl. No. 13/422,750, Response filed Jul. 12, 2013 to Non Final Office Action dated Apr. 12, 2013", 14 pgs.
"U.S. Appl. No. 13/422,750, Response filed Sep. 2, 2014 to Non Final Office Action dated Apr. 1, 2014", 10 pgs.
"U.S. Appl. No. 13/424,682, Non Final Office Action dated Apr. 11, 2013", 6 pgs.
"U.S. Appl. No. 13/424,682, Notice of Allowance dated Jul. 30, 2013", 13 pgs.
"U.S. Appl. No. 13/424,682, Response filed Jul. 5, 2013 to Non Final Office Action dated Apr. 11, 2013", 10 pgs.
"U.S. Appl. No. 13/424,705, Advisory Action dated Nov. 29, 2013", 3 pgs.
"U.S. Appl. No. 13/424,705, Final Office Action dated Sep. 11, 2015", 28 pgs.
"U.S. Appl. No. 13/424,705, Final Office Action dated Sep. 19, 2013", 11 pgs.
"U.S. Appl. No. 13/424,705, Non Final Office Action dated Apr. 12, 2013", 14 pgs.
"U.S. Appl. No. 13/424,705, Non Final Office Action dated Jun. 16, 2014", 21 pgs.
"U.S. Appl. No. 13/424,705, Non Final Office Action dated Jul. 23, 2014", 21 pgs.
"U.S. Appl. No. 13/424,705, Response filed Jul. 12, 2013 to Non Final Office Action dated Apr. 12, 2013", 11 pgs.
"U.S. Appl. No. 13/424,705, Response filed Nov. 19, 2013 to Final Office Action dated Sep. 19, 2013", 11 pgs.
"U.S. Appl. No. 13/424,705, Response filed Nov. 24, 2014 to Non Final Office Action dated Jul. 23, 2014", 14 pgs.
"U.S. Appl. No. 13/452,400, Examiner Interview Summary dated Sep. 11, 2013", 3 pgs.
"U.S. Appl. No. 13/452,400, Final Office Action dated Jul. 5, 2013", 25 pgs.
"U.S. Appl. No. 13/452,400, Final Office Action dated Jul. 30, 2015", 32 pgs.
"U.S. Appl. No. 13/452,400, Non Final Office Action dated Jan. 15, 2015", 24 pgs.
"U.S. Appl. No. 13/452,400, Non Final Office Action dated Oct. 5, 2012", 23 pgs.
"U.S. Appl. No. 13/452,400, Preliminary Amendment filed May 16, 2012", 3 pgs.
"U.S. Appl. No. 13/452,400, Response filed Jan. 7, 2013 to Non Final Office Action dated Oct. 5, 2012", 12 pgs.
"U.S. Appl. No. 13/452,400, Response filed Apr. 15, 2015 to Non Final Office Action dated Jan. 15, 2015", 31 pgs.
"U.S. Appl. No. 13/452,400, Response filed Sep. 26, 2013 to Final Office Action", 12 pgs.
"U.S. Appl. No. 13/553,572 Response filed Jun. 3, 2013 to Non-Final Office Action dated Mar. 7, 2013", 17 pgs.
"U.S. Appl. No. 13/553,572, Final Office Action dated Jul. 2, 2013", 12 pgs.
"U.S. Appl. No. 13/553,572, Non Final Office Action dated Mar. 7, 2013", 14 pgs.
"U.S. Appl. No. 13/553,572, Non Final Office Action dated Nov. 4, 2014", 13 pgs.

(56) References Cited

OTHER PUBLICATIONS

"U.S. Appl. No. 13/553,572, Preliminary Amendment filed Sep. 17, 2012", 7 pgs.
"U.S. Appl. No. 13/553,572, Response filed Jan. 2, 2014 to Final Office Action dated Jul. 2, 2013", 15 pgs.
"U.S. Appl. No. 13/553,596, Advisory Action dated Apr. 29, 2015", 3 pgs.
"U.S. Appl. No. 13/553,596, Final Office Action dated Feb. 4, 2015", 16 pgs.
"U.S. Appl. No. 13/553,596, Non Final Office Action dated Jul. 28, 2014", 14 pgs.
"U.S. Appl. No. 13/553,596, Non Final Office Action dated Aug. 31, 2015", 17 pgs.
"U.S. Appl. No. 13/553,596, Response filed Apr. 6, 2015 to Final Office Action dated Feb. 4, 2015", 10 pgs.
"U.S. Appl. No. 13/553,596, Response filed Nov. 26, 2014 to Non Final Office Action dated Jul. 28, 2014", 8 pgs.
"U.S. Appl. No. 13/594,002, Final Office Action dated Mar. 19, 2015", 36 pgs.
"U.S. Appl. No. 13/594,002, Final Office Action dated Jul. 31, 2013", 24 pgs.
"U.S. Appl. No. 13/594,002, Final Office Action dated Sep. 6, 2016", 55 pgs.
"U.S. Appl. No. 13/594,002, Non Final Office Action dated Feb. 27, 2013", 21 pgs.
"U.S. Appl. No. 13/594,002, Non Final Office Action dated Nov. 30, 2015", 41 pgs.
"U.S. Appl. No. 13/594,002, Non Final Office Action dated Dec. 4, 2014", 29 pgs.
"U.S. Appl. No. 13/594,002, Response filed Mar. 3, 2015 to Non Final Office Action dated Dec. 4, 2014", 23 pgs.
"U.S. Appl. No. 13/594,002, Response filed May 14, 2013 to Non Final Office Action dated Feb. 27, 2013", 11 pgs.
"U.S. Appl. No. 13/594,002, Response filed May 31, 2016 to Non Final Office Action dated Nov. 30, 2015", 12 pgs.
"U.S. Appl. No. 13/594,002, Response filed Aug. 19, 2015 to Final Office Action dated Mar. 19, 2015", 14 pgs.
"U.S. Appl. No. 13/594,002, Response filed Oct. 28, 2013 to Final Office Action dated Jul. 31, 2013", 11 pgs.
"U.S. Appl. No. 13/679,830, Examiner Interview Summary dated Sep. 28, 2017", 3 pgs.
"U.S. Appl. No. 13/679,830, Final Office Action dated Jan. 31, 2014", 27 pgs.
"U.S. Appl. No. 13/679,830, Final Office Action dated Apr. 23, 2015", 36 pgs.
"U.S. Appl. No. 13/679,830, Final Office Action dated Sep. 9, 2016", 59 pgs.
"U.S. Appl. No. 13/679,830, Final Office Action dated Nov. 15, 2017", 98 pgs.
"U.S. Appl. No. 13/679,830, Non Final Office Action dated Jan. 4, 2016", 61 pgs.
"U.S. Appl. No. 13/679,830, Non Final Office Action dated Jun. 14, 2013", 21 pgs.
"U.S. Appl. No. 13/679,830, Non Final Office Action dated Jun. 15, 2017", 82 pgs.
"U.S. Appl. No. 13/679,830, Non Final Office Action dated Nov. 6, 2014", 36 pgs.
"U.S. Appl. No. 13/679,830, Response filed Feb. 6, 2015 to Non Final Office Action dated Nov. 6, 2014", 12 pgs.
"U.S. Appl. No. 13/679,830, Response filed Feb. 9, 2017 to Final Office Action dated Sep. 9, 2016", 19 pgs.
"U.S. Appl. No. 13/679,830, Response filed Jun. 12, 2014 to Final Office Action dated Jan. 31, 2014", 16 pgs.
"U.S. Appl. No. 13/679,830, Response filed Jul. 5, 2016 to Non Final Office Action dated Jan. 4, 2016", 11 pgs.
"U.S. Appl. No. 13/679,830, Response filed Sep. 23, 2015 to Final Office Action dated Apr. 23, 2015", 14 pgs.
"U.S. Appl. No. 13/679,830, Response Filed Oct. 16, 2017 to Non Final Office Action dated Jun. 15, 2017", 13 pgs.
"U.S. Appl. No. 13/679,830, Response filed Nov. 14, 2013 to Non Final Office Action dated Jun. 14, 2013", 14 pgs.
"U.S. Appl. No. 14/094,542, Final Office Action dated Feb. 9, 2015", 6 pgs.
"U.S. Appl. No. 14/094,542, Final Office Action dated Sep. 2, 2015", 6 pgs.
"U.S. Appl. No. 14/094,542, Non Final Office Action dated Feb. 12, 2014", 7 pgs.
"U.S. Appl. No. 14/094,542, Non Final Office Action dated May 19, 2015", 5 pgs.
"U.S. Appl. No. 14/094,542, Non Final Office Action dated Aug. 15, 2014", 7 pgs.
"U.S. Appl. No. 14/094,542, Response filed Jan. 15, 2015 to Non Final Office Action dated Aug. 15, 2014", 10 pgs.
"U.S. Appl. No. 14/094,542, Response filed May 11, 2015 to Final Office Action dated Feb. 9, 2015", 12 pgs.
"U.S. Appl. No. 14/094,542, Response filed Jan. 14, 2014 to Non Final Office Action dated Feb. 12, 2014", 12 pgs.
"U.S. Appl. No. 14/094,542, Response filed Aug. 19, 2015 to Non Final Office Action dated May 19, 2015", 12 pgs.
"U.S. Appl. No. 14/540,346, Non Final Office Action dated Aug. 24, 2015", 16 pgs.
"U.S. Appl. No. 14/540,346, Notice of Allowance dated Mar. 18, 2016", 7 pgs.
"U.S. Appl. No. 14/540,346, Preliminary Amendment filed Dec. 11, 2014", 8 pgs.
"U.S. Appl. No. 14/540,346, Response filed Dec. 23, 2015 to Non Final Office Action dated Aug. 24, 2015", 7 pgs.
"U.S. Appl. No. 14/608,520, Appeal Brief filed May 12, 2017", 25 pgs.
"U.S. Appl. No. 14/608,520, Appeal Decision mailed Nov. 27, 2017", 14 pgs.
"U.S. Appl. No. 14/608,520, Final Office Action dated Oct. 12, 2016", 44 pgs.
"U.S. Appl. No. 14/608,520, Non Final Office Action dated Mar. 18, 2016", 39 pgs.
"U.S. Appl. No. 14/608,520, Non Final Office Action dated Oct. 15, 2015", 19 pgs.
"U.S. Appl. No. 14/608,520, Preliminary Amendment filed Feb. 26, 2015", 10 pgs.
"U.S. Appl. No. 14/608,520, Response filed Jan. 15, 2016 to Non Final Office Action dated Oct. 15, 2015", 9 pgs.
"U.S. Appl. No. 14/608,520, Response filed Sep. 19, 2016 to Non Final Office Action dated Mar. 18, 2016", 12 pgs.
"U.S. Appl. No. 14/628,941, Appeal Brief filed May 12, 2017".
"U.S. Appl. No. 14/628,941, Appeal Decision mailed Dec. 6, 2017", 14 pgs.
"U.S. Appl. No. 14/628,941, Final Office Action dated Oct. 13, 2016", 43 pgs.
"U.S. Appl. No. 14/628,941, Non Final Office Action dated Mar. 18, 2016", 38 pgs.
"U.S. Appl. No. 14/628,941, Non Final Office Action dated Sep. 24, 2015", 21 pgs.
"U.S. Appl. No. 14/628,941, Preliminary Amendment filed Feb. 26, 2015", 9 pgs.
"U.S. Appl. No. 14/628,941, Response filed Sep. 19, 2016 to Non Final Office Action dated Mar. 18, 2016", 12 pgs.
"U.S. Appl. No. 14/628,941, Response filed Dec. 23, 2015 to Non Final Office Action dated Sep. 24, 2015", 9 pgs.
"U.S. Appl. No. 14/826,006, Advisory Action dated May 10, 2017", 3 pgs.
"U.S. Appl. No. 14/826,006, Final Office Action dated Jan. 17, 2017", 13 pgs.
"U.S. Appl. No. 14/826,006, Final Office Action dated Jan. 19, 2018", 17 pgs.
"U.S. Appl. No. 14/826,006, Non Final Office Action dated Jun. 2, 2016", 11 pgs.
"U.S. Appl. No. 14/826,006, Non Final Office Action dated Aug. 18, 2017", 16 pgs.
"U.S. Appl. No. 14/826,006, Preliminary Amendment filed Aug. 28, 2015", 6 pgs.
"U.S. Appl. No. 14/826,006, Response filed Apr. 18, 2017 to Final Office Action dated Jan. 17, 2017", 13 pgs.

(56) References Cited

OTHER PUBLICATIONS

"U.S. Appl. No. 14/826,006, Response filed Nov. 1, 2016 to Non Final Office Action dated Jun. 2, 2016", 7 pgs.
"U.S. Appl. No. 14/826,006, Response filed Nov. 17, 2017 to Non Final Office Action dated Aug. 18, 2017", 11 pgs.
"U.S. Appl. No. 14/826,018, Non Final Office Action dated Jan. 11, 2017", 19 pgs.
"U.S. Appl. No. 14/826,018, Notice of Allowance dated Aug. 28, 2017", 13 pgs.
"U.S. Appl. No. 14/826,018, Preliminary Amendment filed Aug. 28, 2015", 8 pgs.
"U.S. Appl. No. 14/826,018, Response Filed May 11, 2017 to Non Final Office Action dated Jan. 11, 2017", 14 pgs.
"U.S. Appl. No. 14/826,025, Final Office Action dated May 15, 2017", 13 pgs.
"U.S. Appl. No. 14/826,025, Non Final Office Action dated Aug. 25, 2016", 14 pgs.
"U.S. Appl. No. 14/826,025, Preliminary Amendment filed Aug. 28, 2015", 6 pgs.
"U.S. Appl. No. 14/826,025, Response filed Jan. 25, 2017 to Non Final Office Action dated Aug. 25, 2016", 13 pgs.
"U.S. Appl. No. 14/952,699, Non Final Office Action dated Jun. 8, 2016", 9 pgs.
"U.S. Appl. No. 14/952,699, Notice of Allowability dated Oct. 7, 2016", 5 pgs.
"U.S. Appl. No. 14/952,699, Notice of Allowance dated Jan. 9, 2017", 9 pgs.
"U.S. Appl. No. 14/952,699, Notice of Allowance dated Sep. 19, 2016", 8 pgs.
"U.S. Appl. No. 14/952,699, Preliminary Amendment filed May 27, 2016", 8 pgs.
"U.S. Appl. No. 14/952,699, Response filed Sep. 8, 2016 to Non Final Office Action dated Jun. 8, 2016", 8 pgs.
"U.S. Appl. No. 15/057,047, Non Final Office Action dated Sep. 29, 2016", 19 pgs.
"U.S. Appl. No. 15/057,047, Notice of Allowance dated Feb. 10, 2107", 11 pgs.
"U.S. Appl. No. 15/057,047, Preliminary Amendment filed Sep. 15, 2016", 5 pgs.
"U.S. Appl. No. 15/057,047, Response Filed Dec. 29, 2016 to Non Final Office Action dated Sep. 29, 2016", 11 pgs.
"U.S. Appl. No. 15/211,917, Non Final Office Action dated Nov. 15, 2017", 13 pgs.
"U.S. Appl. No. 15/211,917, Preliminary Amendment filed Dec. 2, 2016", 8 pgs.
"U.S. Appl. No. 15/595,629, Preliminary Amendment filed Jul. 24, 2017", 8 pgs.
"U.S. Appl. No. 15/619,150, Preliminary Amendment filed Aug. 28, 2017", 8 pgs.
"U.S. Appl. No. 13/310,417, Response filed Dec. 8, 2014 to Non Final Office Action dated Sep. 8, 2014", 11 pgs.
"U.S. Appl. No. 13/408,877, Reply Brief mailed Aug. 8, 2016", 5 pgs.
"Australian Application Serial No. 2006272510, Office Action dated Oct. 22, 2010", 3 pgs.
"Casefinder Manual, Ch. 1: Overview; Ch. 8: Hyperlinking", [Online]. Retrieved from the Internet: <URL: http://web.archive.org/web/20040419155315/http://www.casefinder.com/downloads/manual-5.00.pdf>, (Archived Apr. 19, 2004), 13 pgs.
"Definition of Timeline", [Online] Retrieved from the Internet: <URL: https://www.yourdictionary.com/>, (Mar. 17, 2015), 1 pg.
"East Text Search Training", (Jan. 2000), 155 pgs.
"European Application Serial No. 05775617.3, Extended European Search Report dated Mar. 24, 2009", 8 pgs.
"European Application Serial No. 06800464.7, Extended European Search Report dated Aug. 24, 2010", 8 pgs.
"Google Definition: System", [Online] Retrieved from the Internet: <URL: http://www.google.com>, (Retrieved Aug. 13, 2012), 3 pgs.
"International Application Serial No. PCT/US2005/026768, Demand mailed Mar. 7, 2007", 9 pgs.

"International Application Serial No. PCT/US2005/026768, international Preliminary Report on Patentability dated Mar. 29, 2007", 8 pgs.
"International Application Serial No. PCT/US2005/026768, International Search Report dated Mar. 7, 2007", 5 pgs.
"International Application Serial No. PCT/US2005/026768, Written Opinion dated Mar. 7, 2007", 5 pgs.
"International Application Serial No. PCT/US2006/029456, International Preliminary Report on Patentability dated Feb. 7, 2008", 9 pgs.
"International Application Serial No. PCT/US2006/029456, International Search Report dated Oct. 1, 2007", 5 pgs.
"International Application Serial No. PCT/US2006/029456, Written Opinion dated Oct. 1, 2007", 7 pgs.
"Module", Dictionary.com, [Online] Retrieved from Internet: <URL: http://dictionary.reference.com/browse/module>, (Retrieved Aug. 13, 2012), 5 pgs.
"Notice from the European Patent Office dated Oct. 1, 2007 concerning business methods", Official Journal of the European Patent Office, 30(11), (Nov. 1, 2007), 592-593.
"Patent Rank: A Network-Dominant Logic for Innovation", Submitted to Marketing Science, manuscript MKSC-Oct 10-0356, (Oct. 2010), 36 pgs.
"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.
"Using Citation Link", Delphion, [Online]. Retrieved from the Internet: <URL: http://web.archive.org/web/20041204224023/www.delphion.com/help/citelink_help>, (Archived Dec. 4, 2004), 10 pgs.
"What is PAIR?", USPTO, [Online]. Retrieved from the Internet: <URL: http://web.archive.org/web/20040606224528/pair.uspto.gov/cgi-bin/final/help.pl>, (Archived Jun. 6, 2004), 9 pgs.
Brinn, Michael W, et al., "Investigation of forward citation count as a patent analysis method", Proceedings of the 2003 Systems and Information Engineering Design Symposium, (2003), 6 pgs.
Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.
Davis, Lee, "The Strategic Use of Patents in International Business", The 28th Annual EIBA Conference, Athens, Greece, (Dec. 2002), 27 pgs.
East, T. W, "Patent Claims How to Keep Track of Them", IEEE Aerospace and Electronic Systems Magazine, 10(8), (Aug. 1995), 32-33.
Fall, C.J., et al., "Literature Survey: Issue to be considered in the automatic classifications of patents", World Intellectual Property Organization, (Oct. 2002), 64 pgs.
Fenton, Gillian M., et al., "Freedom to Operate: The Law Firms Approach and Role", In: Intellectual Property Management in Health and Agricultural Innovation: A Handbook of Best Practices, [online], [retrieved on Mar. 17, 2015], Retrieved from the Internet: <URL: www.iphandbook.org/handbook/ch14/p04/index_print.html>, (2007), 11 pgs.
Gipp, Bela, et al., "Comparative Evaluation of Text- and Citation based Plagiarism Detection Approaches using GuttenPlag", [Online] Retrieved from the Internet: <URL: http://gipp.com/wp-content/papercite-data/pdf/gipp11b.pdf>, (2011), 4 pgs.
Hoover, A. E, "Electronic Filing Top 10 Wish List", IP Today, (Jul. 2006), 2 pgs.
Hutzell, Paula, "Image File Wrapper (IFW) Processing", USPTO PPT Presentation, (May 8, 2003), 25 pgs.
Jagalla, Christopher, "Searching USPTO Assignments on the Web", (Nov. 20, 2010), 4 pgs.
Larkey, L. S, "A Patent Search and Classification System", Proc. of the 4th ACM Conference of Digital Libraries, (1999), 179-187.
Larkey, Leah S, et al., "Collection Selection and Results Merging with Topically Organized U.S. Patents and TREC Data", Proc. of the 9th Int'l Conference on Information and Knowledge Management, (2000), 8 pgs.
Luo, Si, et al., "A Semisupervised Learning Method to Merge Search Engine results", ACM Transactions on Information Systems, vol. 21, No. 4, (Oct. 2002), 35 pgs.

(56) References Cited

OTHER PUBLICATIONS

Mahesh, K., "Ontology Development for Machine Translation: Ideology and Methodology", Technical Report MCCS-96-292, Computing Research Laboratory, New Mexico State University, (1996), 87 pgs.

Mase, H., et al., "Proposal of Two-Stage Patent Retrieval Method Considering the Claim Structure", ACM Transactions on Asian Language Information Processing (TALIP), 4(2), (Jun. 2005), 190-206.

Sheremetyeva, S., et al., "Generating Patent Claims from Interactive Input", Proc. of the 8th International Workshop on Natural Language Generation (NLG), (Jun. 1996), 61-70.

Sheremetyeva, S., et al., "Knowledge Elicitation for Authoring Patent Claims", IEEE Computer, 29(7), (Jul. 1996), 57-63.

Sheremetyeva, S., "Natural Language Analysis of Patent Claims", Proc. of the ACL-2003 Workshop on Patent Corpus Processing, (2003), 66-73.

Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.

Woods, W. A, "Conceptual Indexing: A Better Way to Organize Knowledge", Sun Microsystems, Inc., (1997), 99 pgs.

U.S. Appl. No. 13/573,804, filed Oct. 3, 2012, Systems and Methods for Patent Portfolio Management.

U.S. Appl. No. 13/573,803, filed Oct. 3, 2012, System and Method for Dynamic Contact Management.

U.S. Appl. No. 14/010,376, filed Aug. 26, 2013, Social Media in Patent Portfolio Management.

U.S. Appl. No. 14/010,380, filed Aug. 26, 2013, Mobile Applications in Patent Portfolio Management and Annuity Payments.

U.S. Appl. No. 14/010,391, filed Aug. 26, 2013, Patent Guard Tool.

U.S. Appl. No. 14/010,400, filed Aug. 26, 2013, Patent Troll Monitor.

U.S. Appl. No. 14/483,903, filed Sep. 11, 2014, Systems and Methods for Patent Portfolio Management.

U.S. Appl. No. 16/274,228 U.S. Pat. No. 10,803,073, filed Feb. 12, 2019, Systems, Methods and User Interfaces in a Patent Management System.

U.S. Appl. No. 13/309,166 U.S. Pat. No. 10,242,066, filed Dec. 1, 2011, Systems, Methods and User Interfaces in a Patent Management System.

SYSTEMS, METHODS AND USER INTERFACES IN A PATENT MANAGEMENT SYSTEM

RELATED APPLICATIONS

This application is a continuation of and claims the benefit of priority under 35 U.S.C. § 120 to U.S. patent application Ser. No. 16/274,228, filed on Feb. 12, 2019, which is a continuation of and claims the benefit of priority under 35 U.S.C. § 120 to U.S. patent application Ser. No. 13/309,166, filed on Dec. 1, 2011, now U.S. Pat. No. 10,242,066, issued on Mar. 26, 2019, which claims the benefit under 35 U.S.C. 119(e) of U.S. Provisional Patent Application Ser. No. 61/542,515 filed Oct. 3, 2011, and also claims the benefit under 35 U.S.C. 119(e) of U.S. Provisional Patent Application Ser. No. 61/561,502 filed Nov. 18, 2011, each of which is incorporated herein by reference in its entirety and made a part hereof.

BACKGROUND

The management of a patent portfolio involves multiple stages. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force.

BRIEF DESCRIPTION OF DRAWINGS

Some embodiments are illustrated by way of example and not limitation in the figures of the accompanying drawings in which.

DETAILED DESCRIPTION

Figure 1:
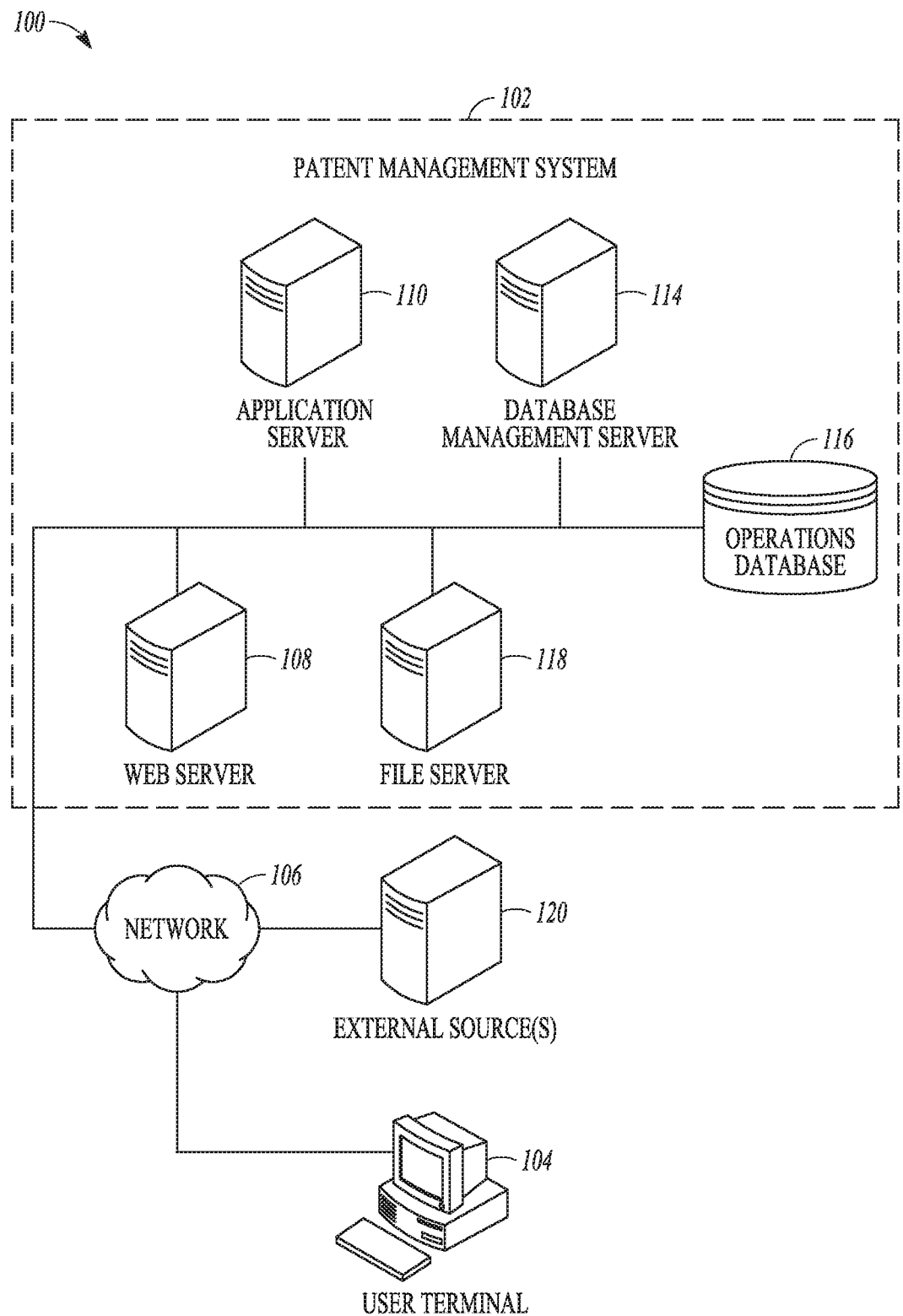
FIG. 1 is a system component diagram, according to an example embodiment.

The life cycle of a patent may include multiple stages. These stages generally include invention, filing a patent application on the invention, prosecuting the patenting application to allowance or abandonment, determining whether to file any continuing applications, and paying maintenance fees on the allowed patent.

At each stage, one or more parties determine the best course of action to take with respect to the invention, For example, when determining whether or not to file a patent, the inventor may know what products are out in the technology area of the invention, a business manager may know how the invention fits in with a company's goals, and a patent attorney may have researched existing patents or application in the technology area of the patent. These parties will ultimately make the decision whether it is worth the initial investment of filing an application on the invention and then determine the next course of action at each future stage.

In some instances, an inventor, business manager or portfolio manager may wish to monitor the patent activities of one or more competitors. The provision of up-to-date information relating to cited references or technology trends in the art to which a user's or competitor's patent portfolio relates may be particularly helpful in devising patenting strategy or making informed business decisions.

In various embodiments, a patent management system includes tools to help the parties involved in the patenting process make decisions at each stage in the life of a patent. These tools may also be used for general research by parties not immediately involved with the patenting of the invention. Additionally, these tools may be used as standalone tools, in combination with other tools, and in combination with other patent management systems. The tools may be used to provide patent analytics information. The tools may also be used to facilitate prosecution of a patent matter, by assisting in extracting and automatically analyzing data from external patent databases, for example. In an example embodiment, tools and systems are provided for a patent management system known as "PAIR Plus".

Examples of tools include, but are not limited to prosecution analytics, reference management, prior art analytics, docketing management, claim mapping, claim analytics, portfolio analytics, external database (e.g., PAIR) analytics, annuity management, and strategic monitoring. The systems, methods and tools of the present invention set forth in this specification are described in relation to a patent management system and patent matters, but it will be understood that the present invention could equally be applied to other forms of intellectual property (trademarks, copyright, registered designs, and the like). Moreover, the term "patent" is not intended to be limited to an issued patent, but may include a pending patent application or un-filed application or invention disclosure. The term "user" is intended to cover any person interacting with the patent management system. A user may be an inventor, portfolio manager, business manager or patent attorney, for example.

FIG. 1 is a schematic view of computer network system 100 according to various embodiments. The computer network system 100 includes patent management system 102 and user terminal 104 communicatively coupled via network 106. In an embodiment, patent management system 102 includes web server 108, application server 110, and database management server 114 which may be used to manage at least operations database 116 and file server 118. Patent management system 102 may be implemented as a distributed system, for example one or more elements of the patent management system 102 may be located across a wide-area network (WAN) from other elements of patent management system 102. As another example, a server (e.g., web server 108, file server 118, database management server 114) may represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the tools of patent management system 102. In addition, application server 110 may also provide some or the entire interface for web server 108 to communicate with one or more of the other servers in patent management system 102 (e.g., database management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), MAX (Asynchronous JavaScript and XML), Java™, JFC (Java™ Foundation Classes), and Swing (an Application Programming Interface for Java™).

User terminal 104 may be a personal computer or mobile device. In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that when viewed as a compilation, represent an "operations database." Sub-databases in such a configuration may include a matter database a portfolio database, a user database, a mapping database and an analytics database. Operations database 116 may be implemented as a relational database, a centralized database, a distributed database, an object oriented database, or a flat database in various embodiments.

In various embodiments, the tools of the patent management system share a common framework. The framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system or within the patent management system. Thus, a user may see a matter listed as its patent number while internally a database of the patent management system may identify it by a random number. One or more matters may be associated with prior art or cited references stored in a reference or prior art database.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes and other structures, names, or formats may be used. Additionally, further associations between data stored in the databases may be created as discussed further herein.

During operation of patent management system 102, data from multiple data sources (internal and external) is imported into or accessed by the operations database 116. Internal sources may include data from the various tools of the patent management system. External sources 120 may include websites or databases associated with foreign and domestic patent offices, assignment databases, WIPO, and INPADOC. In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Figure 2:
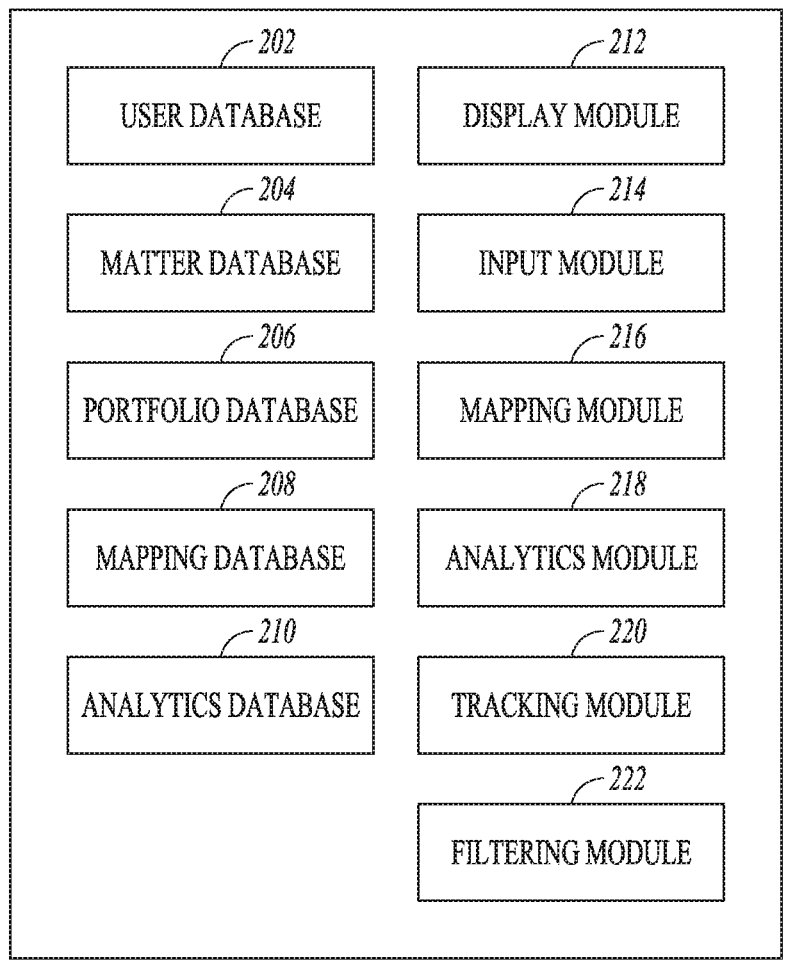
FIG. 2 is a block diagram of a patent management system, according to an example embodiment.

FIG. 2 is a block diagram of patent management system 102, according to an example embodiment. Illustrated are user database 202, matter database 204, portfolio database 206, mapping database 208, analytics database 210, display module 212, input module 214, mapping module 216, analytics module 218, tracking module 220 and filtering module 222. In various embodiments, the data stored in databases 202, 204, 206, 208, and 210 may be in the same or multiple physical locations. For example, portfolio database 206 may be stored in one or more computers associated with a portfolio management service. In various embodiments, patent management system 102 mirrors databases stored in other locations. In an embodiment, when a request is made to access data stored in the databases, patent management system 102 determines where the data is located and directs the request to the appropriate location. Similarly, modules 212-222 may be executed across multiple computer systems.

In an example embodiment user database 202 stores data representing users of patent management system 102. The data may include data fields of user credentials including a user ID and password and access rights with respect to patent management system 102. The user ID may be common across the tools of the patent management system. In this manner, access rights of the user with respect to the tools of the patent management system may follow across the various tools of the patent management system. In an example embodiment, different access rights are granted to a user ID between the various tools.

In various embodiments, each user ID has access rights to one or more matters. Similarly, a user ID may have portfolio level access rights. Access rights may be defined according to at least two parameters: read access and write access. Thus, when a user logs into patent management system 102, the user is presented with access only to the matters/portfolios that have been associated with the user ID. More (e.g., additional contact information) or fewer data fields associated with a user may be included in a user entry stored in user database 202.

In an embodiment, matter database 204 stores data representing matters. Each matter may be associated with one or more portfolios. In some embodiments, a matter is associated with no portfolios. In various embodiments, a matter is a foreign or domestic patent or application. Matters may also be inventions that have not yet been filed (e.g., as may be the case within a docketing system). In an embodiment, a matter entry includes data fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, and annuity information (e.g., due date, country, and amount due). In some embodiments, other patent reference documents or prior art in any form may be stored and associated with one or more matters. More or fewer data fields associated with a patent may be included in a matter entry stored in matter database 204. In an example embodiment, matter database 204 may store a patent matter database, wherein this database includes data about the patent matters. The data may include, for at least one patent matter, a claim set or statement of invention and a priority date for the claim set or statement of invention. Matter database 204 may also store a database of prior art documents (also known as "references"), wherein the prior art database includes data about the prior art documents. The data may include, for at least one prior art document, a priority date or publication date of the document. One or more of the prior art documents may be associated with a first patent matter in the patent matter database. Matter database 204 may also store data obtained from internal or external sources relating to cited references owned by or cited against (in "forward" or "reverse" manner) a target entity (for example, a client of a firm) as well as cited references owned by or cited against (in "forward" or "reverse" manner) another entity (for example, a competitor of the client or other target entity). Public bibliographic details of such cited references may be obtainable from websites or databases associated with foreign and domestic patent offices (PAIR), assignment databases, WIPO, and INPADOC. In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio database 206, in an example embodiment, stores data representing portfolios of one or more matters. Data stored in portfolio database 206 may have been previously generated by a tool of patent management system 102. In various embodiments, a portfolio may be generated by a user using patent management system 102. For example, a user interface may be presented to the user requesting a name for the portfolio and identifiers of matters to be included in the portfolio. In an embodiment, a portfolio entry in portfolio database 206 includes the data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 206.

In various embodiments, mapping database 208 may include mappings of patent concepts to one or more matters. In an example embodiment, the underlying patents and patent claims included in each patent portfolio may be categorized by patent concepts (sometimes referred herein as concepts) such as scope concepts (SC) and technology categories (TC).

In an example embodiment, technology categories are categories that claims relate to, but are not necessarily limited to. For example, a claim to a pulse generator may be put in the technology category "pacemaker", but not be limited to a pacemaker per se—perhaps the claim merely says that the pulse generator generates a pulse of certain type that is useful for pacing, but pacing does not appear in the claim. Hence, the claim relates to the technology category "pacemaker," but it is not limited to being a pacemaker.

In an example embodiment, scope concepts are concepts that a claim is limited to. This is contrast to technology categories, where the claim may be mapped to a TC but it not necessarily limited to it. A scope concept may be defined in a way to give the concept a context that a user can understand without necessarily having to look at the corresponding claim language. For example, if the scope concept is "method or apparatus for cardiac rhythm management", and it is mapped to claim A, then claim A by definition is limited to this application, such that if a target device does not perform cardiac rhythm management, then it would not infringe claim A.

In an example embodiment, there are two types of scope concepts: 1) high level scope concepts that are like technical categories in the sense they are broad and general and apply to many claims in a portfolio; and 2) scope concepts that are specific to a limited number of claims—for example all claims in a patent may be limited to a very specific distinguishing feature, and this feature could be the basis for a scope concept.

In some example embodiments, high level scope concepts may be defined prior to mapping, and then assigned as applicable. For example, several scope concepts like: atrial pacing, ventricular pacing, defibrillation method or device, etc, may be defined. Then a mapping team may go through all claims in a portfolio and map these scope concepts to claims that are limited to these concepts. After the mapping is complete, an analysis may be done showing how many claims in the portfolio are limited to each of these scope concepts, and the claims may be presented for each SC. This may be useful is disqualify claims that are not of interest to a particular target (e.g., if an analysis is being done to find a claim that covers an alleged infringer).

In some example embodiments, specific scope concepts are mapped patent by patent or by patent family. These may enable a person to create one or two scope concepts that can be mapped across all claims in given patent, a family of patents, or across a portion of a patent portfolio. In order to effectively formulate a scope concept that may be globally useful across a patent portfolio, it may be useful to be able to examine multiple patent claims at the same time even if they are not all in the same patent or patent family. A keyword mapping may indicate that there is an exact match between the keyword and a subset of the claim language.

In various embodiments, analytics database 210 stores data representing calculated analytics on data stored within patent management system 102 or external data sources. In various embodiments, analytics are organized according to an individual matter, a portfolio, or family, or date of an event (such as an assignment recordal, for example). Events may be organized by a date range (for example, all assignments occurring between Corporation A and Corporation B in the last 6 months, or all filings made by inventor X in last 12 months). The calculated analytics may be based on information gathered from multiple sources such as databases of patent management system 102 and PAIR.

In various embodiments, information for an individual matter may include status (e.g., disclosure received, drafting, filed, completed-waiting examination, in prosecution, allowed, issued), cited prior art, list and type of rejections (e.g., 35 U.S.C. § 101, 102, 103) number of claims allowed, office action count, interviews held, IDS statements filed, attorney fees to date, and PTO fees to date. Further metrics for an individual matter stored in analytics database 210 may include, time waiting for examiner, total time in examination, time waiting for PTO while in examination, and time on appeal. Additional prosecution details may include an upcoming docket date (e.g., due dates for office action, IDS due dates, etc.). A claim prosecution history chart may also be stored in analytics database 210 for each matter. The prosecution history may include a history of claim amendments and arguments made in prosecution.

In various embodiments, portfolio and family analytics information may be stored in analytics database 210 based on aggregating the metrics for an individual matter. In an embodiment, the analytics of a family may differ from those in a portfolio as not all family member matters may be part of a portfolio. Additionally, the analytics may be stored for multiple time periods such that comparisons may be made between current metrics and metrics from a year ago (or other time period).

Aggregated metrics may include a total patents and applications, pending and waiting for examination, in prosecution with no claims allowed, in prosecution with some claims allowed, appealed, notice of allowance received, and issued. These metrics may be compiled for both US and international matters in the portfolio. Additional information may include the international portfolio distribution by country. An age distribution of the portfolio may also be compiled. For example the portfolio may be broken down by less than one year old, 1 to 3 years old, 3 to 5 years old, 5 to 10 years old, 10 to 20 years old, and 20 or more years old. Recent filing and issue activity as well as upcoming Ford filing deadlines may be stored in analytics database 210.

In various embodiments, prosecution metrics across a portfolio or family are determined and stored in analytics database 210. This data may include matters waiting for examination, matters in examination, matters appealed, and cases allowed but not yet issued. Analytics with respect office actions may also be compiled and stored. For example success of allowance after a first office action response, a second response, and so forth may be stored in analytics database 210. Additional prosecution analytics may include allowance rate (e.g., 10%) after a telephone interview, allowance after an in-person interview, percentage of interviews with response, number and type of rejection, average time in prosecution (e.g., in months), average time to file a response, and average time to next office action. Further, the list of recently allowed cases, recently appealed cases, stalled cases, and recently abandoned cases may also be stored for each portfolio and family in analytics database 210.

In various embodiments, the results of keyword analysis on one or more matters and/or prior art references may be stored in analytics database 210. The keyword analysis may be based on the occurrences of the keywords in the matter or references to derive a score or keyword overlap.

In various embodiments, data stored in the database for a group of matters in a portfolio or family is analyzed to determine the top (e.g., ten) most cited patents, the top most cited inventors, top most cited prior art owners (e.g., according to assignment documents or the face of the patent), newly (e.g., within the last 60 days) cited prior art owners, and top most cited prior art inventors. This information may be stored in analytics database 210.

In an embodiment, display module 212 is configured to display user interfaces and information retrieved from one or more databases 202-210. If a user is accessing patent management system 102 remotely (e.g., through a web browser) display module 212 may be configured to transmit data representing a user-interface through a network to a user terminal. In various embodiments, display module 212 is configured to generate one or more charts of data stored in databases 202-210. For example, display module 212 may generate a pie chart of the top 10 inventors within a portfolio.

In various embodiments, input module 214 receives data from multiple sources where it may be further processed by one or more other modules and stored in one or more of databases 202-210. In various embodiments, input module 214 or the patent management system 102 may comprise a search engine (not shown) for conducting searches at a patent registry or on the Internet. For example, input module 214 may be configured to utilize one or more APIs to data from one or more patent data stores (e.g., public PAIR, private PAIR, INPADOC, foreign patent offices, patent docketing systems, portfolio management systems, etc). The data may include published patent documents, patent applications, office actions or other patent office correspondence, prior art references, claim mappings, dockets dates, annuity payment data and patent or patent application assignment information. Specific assignment data may include details pertaining to the assignor or assignee (e.g. name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is configured to receive input from one or more user interface elements. For example patent management system 102 may present multiple user interfaces to a user. These user interfaces may enable users to input data directly into databases 202-210, instruct the patent management system to retrieve data from patent data stores, and instruct the patent management system to perform various operations (e.g., analysis) on the data in databases 202-210.

Additionally, input module 214 may be configured to determine the selection of one or more user interface elements by a user and initiate the action associated with the selected user interface element. For example, a user interface element may include a drop-down menu to select a portfolio. Input module 214 may be configured to receive the selection of the portfolio by the user. Then, input module 214 may pass the selection to one or more other modules for further processing. For example, display module 212 may update the drop-down menu to indicate the selection of the portfolio. In other example embodiments, a user may select an assignee name, or technology field, or date range of potential interest (or a combination of these or other aspects of interest), for which the user wishes to be informed of recent or ongoing assignment or change in ownership status. The user may request to be informed regularly (daily, weekly or monthly, for example) of ongoing assignments or changes in ownership by making a selection of the appropriate interface elements.

In various embodiments, input module 214 processes the data that has been inputted and formats it according to the data fields of databases 202-210 as discussed above. In various embodiments processing is completed using a parsing module (not shown). For example, consider a patent publication that a user has directed to be inputted into one or more of the databases. The parsing module may use a combination of automatic image recognition and text analysis to determine the filing date, issue date, title, abstract, and claims of the patent. In some embodiments, the parsing module may flag certain pieces of data that had been determined to be potentially inaccurate (e.g., a number could not be read). A user of patent management system 102 may then examine the flagged data and manually enter the information which is then stored in the appropriate database.

The resulting data that has been parsed by the parsing module may then be entered as an entry in one or more of databases 202-210. This may be accomplished by, for example, formulating an insert SQL query with the parsed information. In various embodiments the parsing module may parse multiple pieces of information before generating a database entry. For example, input module 214 may receive a docket number for an issued patent. The docket number may be combined with the information parsed from the issued patent to form an entry in matter database 204.

In various embodiments, mapping module 216 is configured to facilitate mappings of scope concept, technology categories, prior art and keywords to patent claims of a matter. In an embodiment, mapping signifies association. For example, in conjunction with display module 212 and input module 214, mapping module 216 may present a user interface of patent claims stored in matter database 204 and scope concepts stored in mapping database 208. Input module 214 may receive a selection of one or more patent claims and one or more scope concepts and pass them to mapping module 216. Mapping module 216 may then formulate an SQL query to associate the one or more patents claims with the one or more scope concepts. When executed, the SQL query, may update the mapping database 208 with the associations. In various embodiments, mapping module 216 also allows the creation of new scope concepts, technology categories, and keywords that may be mapped to one or more patent claims. Furthermore, mapping module may present user interfaces that allow a user to rank and rate matters stored in matter database 204.

Mapping module 216 may also allow the generation of claim charts of a plurality of cells. A claim chart may include one or more scope concepts, technology categories, and keywords on one axis and claims of matters in a portfolio on the other axis. The claim chart may include a variety of levels of granularity of scope concepts. Some claims may be mapped to all of the scope concepts while others may not be mapped to any scope concepts. At the cell intersection between a scope concept (or technology category or keyword) and a claim an indication of the mapping may be presented by changing the format of the cell. For example, the cell may be colored blue when a scope concept is mapped and red when not mapped.

In various embodiments, analytics module 218 is configured to examine and run calculations on the data stored in the databases 202-210 to generate the analytics previously discussed. For example, analytics module 218 may formulate an SQL query that retrieves the number of times that a prior art reference has been cited within a portfolio. This query may be run for each prior art cited within the portfolio to determine a list of the most cited (e.g., the top ten) prior art references with a portfolio. In an embodiment, the queries are formulated and run as requested by a user. In an embodiment, once the analytics information has been determined, it is stored within analytics database 210. In various embodiments, queries are formulated and run on a periodic basis (e.g., nightly) and entries in analytics database 210 may be updated to reflect any changes. In other embodiments, the analytics module 218 may in response to user input formulate a query to examine how many times a given patent matter has been assigned or been subject to a change in ownership from one party to another. Other queries analyzing patent assignment data may be run as requested by a user.

In various embodiments, the analytics module 218 is configured to analyze and map cited reference data stored in the matter database 204. The data may be scraped in by the input module 214. For example, cited references owned by or cited against target or other entities as mentioned above may be mapped against each other to determine a "prior art" overlap. The overlap may be presented graphically, for example in a graphic user interface presented in user terminal 104. In various embodiments, the overlap may relate to so-called "forward" citations, or "reverse" citations, or both. In various embodiments, the overlap may be presented for a target company and one or more competitors. Changes in the overlap over time may also be stored and mapped to give an indication to a user of technology trends, changes in trends and the ongoing development of potentially relevant prior art. In various embodiments, a prior art overlap between a target and competitor may be stored, mapped and shown for a single patent, a portfolio of patents, or a family of patents. The target and other entities of interest, such as competitor companies or inventors, may be selected by the user.

An analytical result or mapping may be displayed as a list of prior art cited against both the target and competitor, with an indication of which art overlaps or is common to both listings. In various embodiments, the analytical result or mapping may in addition or alternatively present a list of companies that own the prior art cited against the target and other entities. The target company may appear as an owner. The display module 212 may be configured to display the results of the mappings and overlap of cited references as a bar chart, or listings, or other graphic, in a user interface of the type shown for example in FIG. 4.

In various embodiments, the analytics module 218 is configured to receive input identifying a pool of keywords for a first patent matter in matter database 204 and associated prior art documents in matter database 204. The tem keyword is intended to include individual keywords as well as a number of keywords grouped together making up a key phrase, for example. The module 218 may be further configured to perform a keyword analysis on the first patent matter and associated prior art documents based on occurrences of the keywords in the first patent matter and associated prior art documents. The analytics module 218 may be further configured to identify, based on the analysis, keywords occurring uniquely in the first patent matter. In view of their uniquely occurring nature, these keywords may be regarded as claim elements potentially differentiating the claim set or statement of invention over the disclosures contained in the one or more prior art documents.

In various embodiments, the analytics module 218 is configured to generate for a user the patent activity profiles of one or more entities. The entities may be competitive entities to the user, or the user's employer or client. The generated activity profiles may form part of information to assist in strategic monitoring of patent portfolios. A patent activity profile may be built for a particular patent applicant or owner, or a type of owner, and then deviances from that profile may be flagged. The profile may include foreign tiling patterns, US filing patterns—for example, does the owner typically file a provisional application first, followed by a PCT application, or is a US application typically filed thereafter? The profile may include information about abandonments—for example, what subject matter does an owner give up on or surrender during prosecution, or in making abandonment decisions? In various embodiments, the profile may include information about instances or circumstances in which an owner does not pay a patent annuity or renewal fee. The profile may include any of the data stored in analytics database 210 referred to above. Analytics module 218 may be configured to flag deviances from a profile and send update alerts sent to a user accordingly. For example, in conjunction with display module 212 and input module 214, analytics module 218 may present to a user an interface indicating one or more patent activity profiles for one or more patent owners for the user to select and review.

In some embodiments, a prior art date analyzer system or tool is provided. The system interacts with an external patent database, such as PAIR, to pull from PAIR priority dates based on user-selected patent matters and apply prior art rules to determine the likely effective date of the reference as a potential citation against another patent matter.

In some embodiments a prior art date analyzer system comprises a search engine (not shown, but for example part of input module 214) to retrieve data from an external patent database (for example PAIR), the data including at least one priority date for a patent matter stored in the database, and an analytics module (for example analytics module 218) configured to receive input identifying national prior art rules, analyze the retrieved data to identify criteria relevant to the rules, and to determine automatically the likely effective date of the reference. The analyzer system may further comprise a database (for example matter database 204 or analytics database 210) for storing a plurality of national prior art rules for configuring the analytics module to perform the date analysis.

The analyzer system may further comprise a display module for displaying the results of the date analysis to a user, and in some embodiments, the display module is configured to display the results to a user in a hand-held electronic or mobile device.

In some embodiments, a patent management system comprises a network 106; at least one database 116 (or any of its sub-databases 202-210) accessible on the network and storing data including at least one priority date for a patent matter stored in the database; and a server (110-118), operatively connected to the network, wherein the server includes a processor, a memory, and software operable on the processor to receive input identifying a patent matter in the database and retrieve at least one priority date for the matter from the database, receive input identifying national prior art rules, analyze the retrieved data to identify criteria relevant to the rules, and to determine automatically the likely effective date of the reference.

The tracking module 220, according to an example embodiment, maintains information related to a specific patent, group of patents, or concept. For example, the tracking module may store information related to a patent's prosecution and litigation history (such as office actions or claim amendments). In other example embodiments, the tracking module 220 may store information relating to the assignment of patent applications or patents from one assignee to another, or from an inventor to employer assignee, for example. Information of this nature may be stored by tracking module 220 for defined sets of applications or patents registered in a specified name, and within certain date ranges, for example. Update alerts (e.g., electronic mail, SMS, or similar) may be sent to a user indicating a change in ownership for a patent or patent application.

In various embodiments, the filtering module 222 is configured to filter a set of matters according to a user preference. For example, a user may activate a check box that indicates only pending matters should be shown in a user interface. Filtering module 222 may formulate an assignment query consistent with retrieving only pending matters. The results of the query (or any query) may then be shared with display module 212 where the user interface may be updated. The regular alerts may in other example embodiments be pushed to a user terminal 104, an external website, an intranet site, a PDA, smart phone, or other similar handheld device.

In various embodiments, a patent management system 102 may be provided for automatically monitoring developments in a field of prior art. The system may comprise a database for maintaining an ontology of patent concepts of the type described above, and an input module 214 for receiving a search query including a first patent concept related to the field of prior art to be monitored. In an example embodiment, a search engine (not shown) may be provided and configured to search the Internet as a function of the search query and generate a first set of search results. The search engine may be further configured to run a second search, as a function of the same search query, on a subsequent occasion to generate a second set of search results. The analytics module 218 may be configured to compare the first and second sets of search results to identify differences in the results, and the display module 212 may be configured to communicate the differences in the search results to a user.

The system may further comprising a patent matter database (e.g. matter database 204) wherein the database includes data about the patent matters and the data including a claim set for at least one patent matter and wherein the first patent concept relates to at least one feature of the claim set. In one example embodiment, the input module may be further configured to receive the search query including the first patent concept from a user who may select at least one patent concept from the stored ontology or provide a new patent concept. In another example embodiment, the mapping module 216 may be configured to automatically provide the search query including the first patent concept to the input module 214, and may be further configured to automatically select at least one patent concept from the stored ontology. The first patent concept may include at least one keyword, for example at least one keyword present in the claim set. In an example embodiment, the first patent concept may include at least one scope concept, for example at least one scope concept present in the claim set.

In various embodiments and with reference to FIG. 2, a system for managing patent matters 102 may comprise an input module 214 to scrape patent data from an external patent database 120 (such as PAIR), the data including event dates of at least one patent matter; a docket engine (not shown but may be part of analytics module 218) to docket the scraped event dates and, based on the scraped dates, to calculate response due dates for the at least one patent matter; a search engine (not shown but may be part of input module 214) to identify and download at least one document from the external patent database 120; and a mapping module 216 to associate at least one response due date with the at least one downloaded document.

The input module may scrape data including a transaction log from the external database, such as a log of office actions for at least one patent matter. The docket engine may, in some embodiments, docket response due dates including dates for filing foreign applications or prior art cross-citation. The mapping module 216 may in some embodiment associate the at least one response due date with the at least one downloaded document by embedding the at least one due date in the downloaded document. The at least one downloaded document and the at least one due date embedded in it may be in PDF, Excel or XML form. In some embodiments, the mapping module 216 may provide the response due dates in a user's Outlook calendar, for example.

In some embodiments, a patent management system comprises a network 106; at least one patent database (operations database 116, sub-databases 202-210, or external source database at USPTO PAIR, for example), accessible on the network, and storing data including event dates of at least one patent matter stored in the database, and a server (any one of 110-118), operatively connected to the network, wherein the server includes a processor, a memory, software operable on the processor to scrape patent data from the patent database, the data including event dates of at least one patent matter, docket the scraped event dates and, based on the scraped dates, calculate response due dates for the at least one patent matter, download at least one document from the external patent database, and associate at least one response due date with the at least one downloaded document.

In various embodiments, a system for generating patent prosecution analytics for as patent management system 102 comprises an input module 214 to scrape data from an external patent database 120 (such as PAIR), the data containing information about office action activity and responses thereto for at least one patent matter stored in the database; and one or more analytics modules 218 to analyze the office action activity and responses thereto to identify at least instances in which a response has resulted in allowance of at least one claim in the at least one patent matter, or at least instances in which a response has not resulted in allowance of a claim in the at least one patent matter; identify at least one Examiner or attorney associated with the instances of allowance or non-allowance; and create a prosecution profile for the Examiner or attorney based on the identified instances of allowance or non-allowance.

The one or more analytics modules 218 may identify the grounds of rejection relied upon in the office action activity for the at least one patent matter and, based on the grounds of rejection, group the instances of allowance or non-allowance in the created profile for the Examiner or attorney. In some embodiments, the one or more analytics modules 218 may generate a listing of prosecution profiles for the Examiners or attorneys, the listing comprising prosecution success rates for the Examiners or attorneys based on the number of instances of allowance or non-allowance. In further example embodiments, the one or more analytics modules may generate a listing of prosecution profiles for the Examiners or attorneys, the listing comprising prosecution success rates for the Examiners or attorneys based on the number of instances of allowance or non-allowance grouped according to the identified grounds of rejection.

In various embodiments, a patent management system comprises a network 106; at least one patent database (any one or more of databases 116, 202-210, or external database source 120) accessible on the network 106, and storing data containing information about office action activity and responses thereto for at least one patent matter stored in the database, and a server (any one or more of 110-118), operatively connected to the network 106, wherein the server includes a processor, a memory, and software operable on the processor to scrape data from the patent database, the scraped data containing information about office action activity and responses thereto for at least one patent matter stored in the database; analyze the scraped data to identify at least instances in which a response has resulted in allowance of at least one claim in the at least one patent matter, or at least instances in which a response has not resulted in allowance of a claim in the at least one patent matter; identify at least one Examiner or attorney associated with the instances of allowance or non-allowance; and create a prosecution profile for the Examiner or attorney based on the identified instances of allowance or non-allowance.

In various embodiments, a patent management system 102 has one or more hard-wired modules (any one or more of modules 212-222) to perform at least a portion of one or more of the following: download at least one patent document from an external patent database 120; apply optical character recognition to the downloaded document to provide a text-readable version of the at least one patent document; automatically apply electronic text analysis to the text-readable version to extract one or more data elements associated with a field of interest, and transmit the data elements to a user. The one or more hard-wired modules (212-222) may further be configured to embed an action date in the text-readable version of the at least one patent document.

In various embodiments, a patent management system 102 presents one or more data fields of interest to a user. The data fields may for example be any of those associated with the user interface elements described. further below in relation to FIG. 4, or as described above in relation to the information processed by analytics module 218. The system 102 comprises a network 106; at least one patent database (anyone or more of 116, 202-210, or external database source 120) accessible on the network and storing data relating to one or more of the data fields of interest for at least one patent matter stored in the database, and a server (any one or more of servers 110-118), operatively connected to the network, wherein the server includes a processor, a memory, and software operable on the processor to download at least one patent document from the external patent database; apply optical character recognition to the downloaded document to provide a text-readable version of the at least one patent document; automatically apply electronic text analysis to the text-readable version to extract one or more data elements associated with a field of interest, and transmit the data elements to a user. The software may be further operable on the processor to embed an action date in the text-readable version of the at least one patent document.

In various embodiments, a patent management system 102 has a system for automatically proofing the patent specification of a granted patent issued on a patent application, the system having one or more hard-wired modules (212-222) configured to perform at least a portion of one or more of the following: scan amendments made to the patent application during prosecution; assemble the most recent claims, based on the scanned amendments, to create a test claim set of the claims; compare the test claim set to the claims as published of the issued patent; and identify any differences between the compared sets of claims and communicating the differences to a user.

The one or more hard-wired modules (212-222) may further render the specification of the patent as issued into text-readable form; automatically compare the text of the specification as filed to the text of the specification of the patent as issued; automatically identify any differences between the compared specifications; and communicate the differences to a user.

In various embodiments, a patent management system comprises a network 106, at least one patent database any one or more of databases 116, 202-210, or external database source 120) accessible on the network and storing the prosecution history and patent specifications as filed and as issued of at least one patent matter stored in the database, and a server (any one or more of servers 110-118) operatively connected to the network, wherein the server includes a processor, a memory, software operable on the processor to download at least portions of the file history and specification as issued of at least one patent matter stored in the patent database; scan amendments made to the patent matter during prosecution; assemble the most recent pending claims, based on the scanned amendments, to create a test claim set of the claims; compare the test claim set to the claims as published of the issued patent; and identify any differences between the compared sets of claims and communicate the differences to a user. The software may be further operable on the processor to render the specification of the patent as issued into text-readable form; automatically compare the text of the specification as filed to the text of the specification of the patent as issued; automatically identify any differences between the compared specifications; and communicate the differences to a user.

Some embodiments of the present inventive subject matter include methods for aspects of patent management. Block diagrams of such methods are shown in FIGS. 3A-3.

Figure 3A:
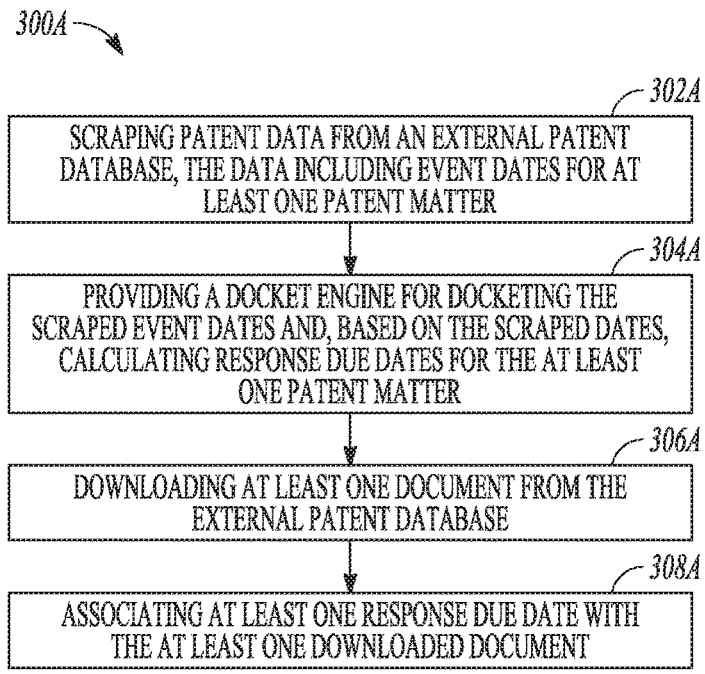
FIGS. 3A-3D are block diagrams showing methods for aspects of patent management, according to example embodiment.

One such embodiment is illustrated in FIG. 3A. A method 300A for managing patent matters comprises: at block 302A, scraping patent data from an external patent database, the data including event dates for at least one patent matter; at block 304A, providing a docket engine for docketing the scraped event dates and, based on the scraped dates, calculating response due dates for the at least one patent matter; at block 306A, downloading at least one document from the external patent database; and at block 308A, associating at least one response due date with the at least one downloaded document.

The step of scraping data may include scraping a transaction log from the external database and in some embodiments the transaction log is a log of office actions for the at least one patent matter. The response due dates may include dates for filing foreign applications or prior art cross-citation. The step of associating at least one response due date with the at least one downloaded document may include embedding the at least one due date in the downloaded document. The at least one downloaded document and the at least one due date embedded in it may be in PDF, Excel or XML form. The method 300A may include providing the response due dates in a user's Outlook calendar. The external patent database may be the USPTO database accessible via PAIR.

Figure 3B:
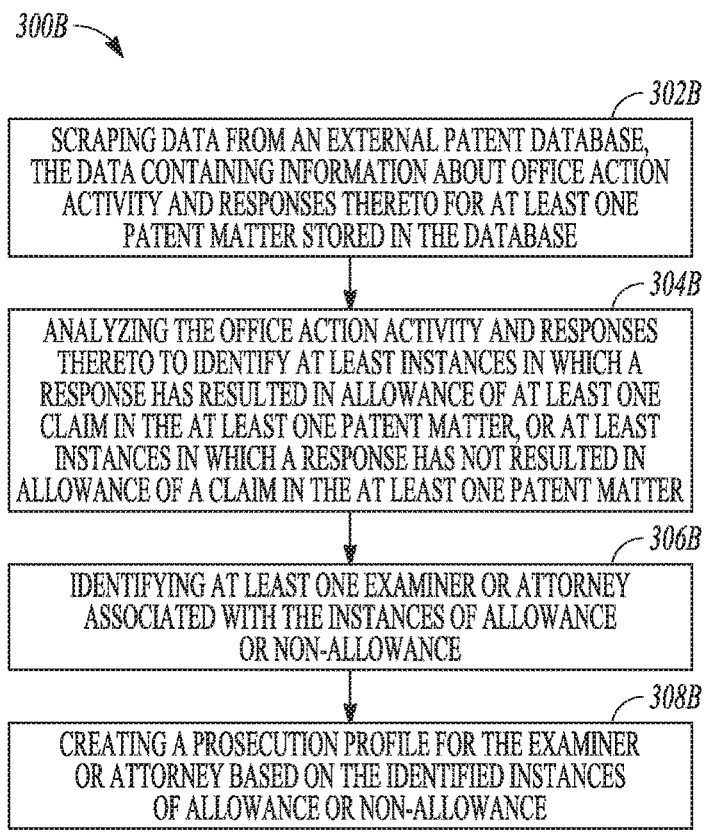

Another example method embodiment is shown in FIG. 3B. A method 300B of generating patent prosecution analytics may comprise: at block 302B scraping data from an external patent database, the data containing information about office action activity and responses thereto for at least one patent matter stored in the database; at block 304B, analyzing the office action activity and responses thereto to identify at least instances in which a response has resulted in allowance of at least one claim in the at least one patent matter, or at least instances in which a response has not resulted in allowance of a claim in the at least one patent matter; at block 306B, identifying at least one Examiner or attorney associated with the instances of allowance or non-allowance; and at block 308B creating a prosecution profile for the Examiner or attorney based on the identified instances of allowance or non-allowance.

The method 300B may further comprise identifying the grounds of rejection relied upon in the office action activity for at least one patent matter and, based on the grounds of rejection, grouping the instances of allowance or non-allowance in the created profile for the Examiner or attorney. In some embodiments, the method may further comprise generating a listing of prosecution profiles for the Examiners or attorneys, the listing comprising prosecution success rates for the Examiners or attorneys based on the number of instances of allowance or non-allowance. The success rates may be based on the number of instances of allowance or non-allowance grouped according to the identified grounds of rejection. The method may include transmitting a prosecution profile for an Examiner or attorney to a user.

Figure 3C:
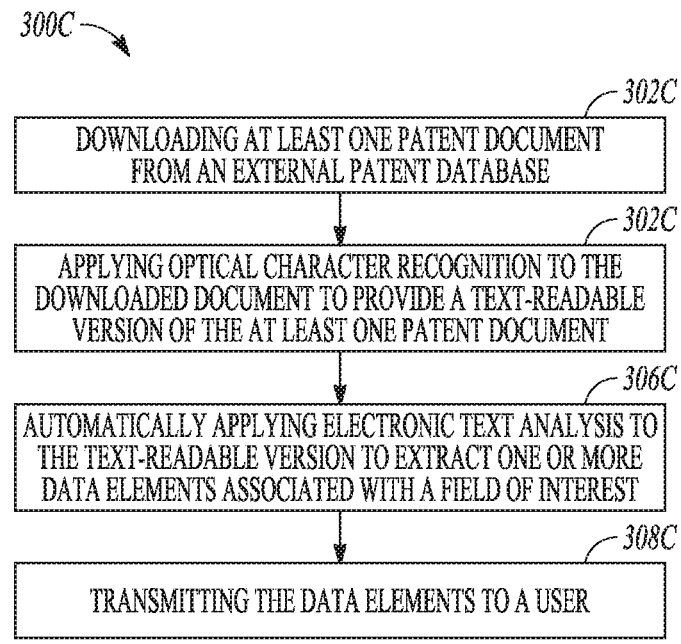

In another example embodiment shown in FIG. 3C, a method 300C of providing data for a patent management system which presents one or more data fields of interest to a user is set out in a block diagram. The method 300C may comprise: at block 302C, downloading at least one patent document from an external patent database; at block 304C, applying optical character recognition to the downloaded document to provide a text-readable version of the at least one patent document; at block 306C, automatically applying electronic text analysis to the text-readable version to extract one or more data elements associated with a field of interest; and at block 308C, transmitting the data elements to a user. In an example embodiment, the method may further comprise the step of embedding an action date in the text-readable version of the at least one patent document.

Figure 3D:
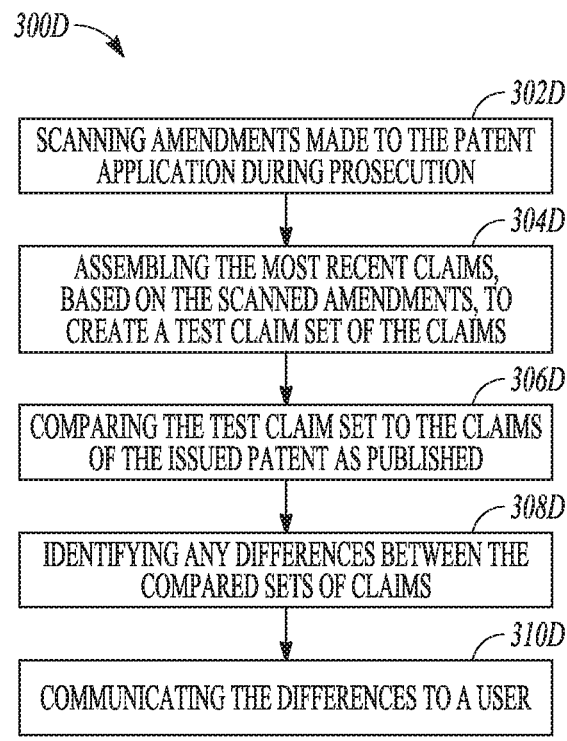

Another example method embodiment is shown in FIG. 3D. A method 300D of automatically proofing the patent specification of a granted patent issued on a patent application is provided. The method 300D comprises the steps of: at block 302D, scanning amendments made to the patent application during prosecution; at block 304D, assembling the most recent claims, based on the scanned amendments, to create a test claim set of the claims; at block 306D, comparing the test claim set to the claims of the issued patent as published; at block 308D, identifying any differences between the compared sets of claims; and at block 310D, communicating the differences to a user.

The method 300D may further comprise the steps of rendering the specification of the patent as issued into text-readable form; automatically comparing the text of the specification as filed to the text of the specification of the patent as issued; automatically identifying any differences between the compared specifications; and communicating the differences to a user.

Figure 4:
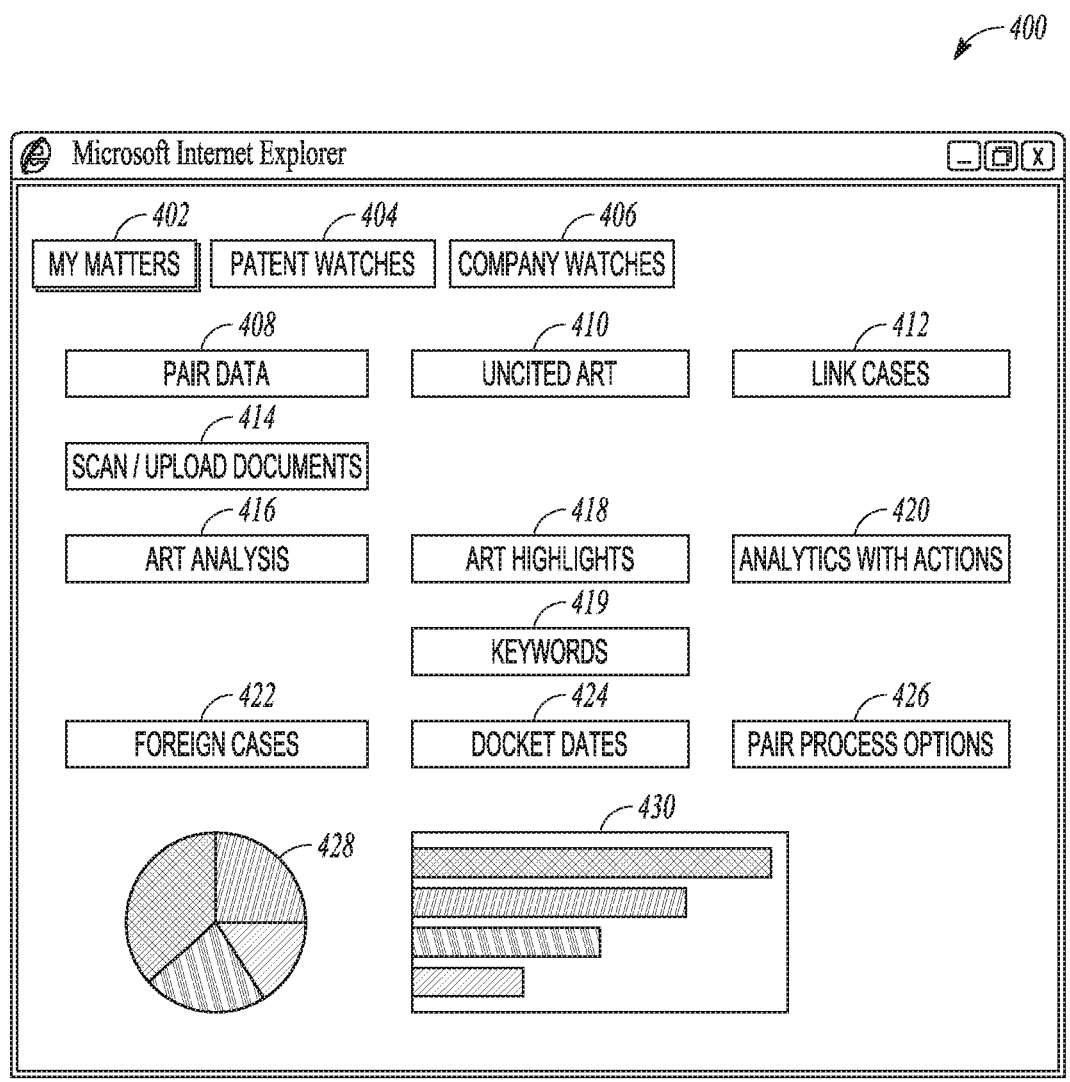
FIG. 4 is a depiction of a user interface, according to an example embodiment.

Reference is now made to FIG. 4 which shows a user interface 400 that may be used to facilitate the methods of the present inventive subject matter, according to example embodiments. The user interface 400 may be displayed by display module 212 described above. The user interface may be provided in a website, computer monitor, or mobile device. The type of user elements, names, and layout depicted in FIG. 4 are intended to be an illustration of an example user interface of patent management system 102. Other types of user elements, names, and layouts may be used.

User interface 400 is illustrated with multiple user interface elements. In an example embodiment, a user interface element is a graphical or textual element that a user may interact with to cause an application to perform an assigned action for the interface element. Data representing user interface 400 may be transmitted via network 106 and presented on a display of user terminal 104 through the use of a web browser. A user (e.g., manager of a patent portfolio etc) may interact with the user interface elements of user interface 400 through the use of an input device (e.g., stylus, cursor, mouse, a finger) of the user terminal. In an embodiment, a user selection is based on the coordinates of the input device as it makes contact with the display or where a user "clicks" the mouse. The coordinates are compared to the coordinates of the user input element to determine the selection. The type of user elements, names, and layout depicted in FIG. 4 are intended to be an illustration of an example user interface of patent management system 102. Other types of user elements, names, and layouts may be used. Some elements may be omitted in various embodiments depending on the nature of management tool provided.

In general, the user interface elements may include my matters 402, patent watches 404, and company watches 406. These elements may be used to select a context/view of the patent management system. For example, my matters 402 lists the patents included within a portfolio of a user, patent watches 404 lists information on patents that the user has indicated the patent management system is to watch, and company watches 406 lists information on companies that the user has indicated the system should watch.

In various embodiments relating to a "PAIR Plus" patent management and analytics system, the user interface 400 may have further user interface elements. The system has access to at least one patent matter database (in this case the USPTO PAIR database, although others could be used) and at least one reference database, for example a reference database stored in matter database 204. A first user interface element 408 (PAIR data) allows selection by a user of data stored in PAIR. A second user interface element 410 (Uncited Art) allows selection by a user of data stored in the at least one reference database (for example, references stored in matter database 204). User element 412 (Link cases) is a third user interface element for linking or associating at least one of the references stored in the reference database with at least one of the patent matters selected by the user from PAIR. A fourth user interface element 414 (Scan/Upload documents) allows a user to select for storage further references into the reference database. In an example embodiment, input module 214 may be used to find and load the selected document into the database 204. A fifth user interface element 416 (Art Analysis) allows a user to select analysis of at least one of the linked references. In an example embodiment, the analysis is performed by the analytics module 218. In an example embodiment, the linked reference may be a reference not previously cited by the USPTO in an Office Action issued against the patent matter. In this situation, the third user interface element 412 (Link cases) may be used to link or associate the uncited reference with the patent matter for potential citation in an information disclosure statement.

User selection of the fifth user element 416 may further provide a general analytics view of at least one patent matter or reference stored in PAIR. or the database 204. A user may request further analysis by selecting user interface elements 418 (Art Highlights) and element 420 (Analytics with Actions). Using element 418 for example allows a user to view the results of a keyword analysis undertaken on at least one of the linked references. The keyword analysis may be performed by the analytics module 420 as described further above using keywords or patent concepts entered by a user in user interface element 419. Selection of element 420 may allow a user to view a list of docket dates and actions to be undertaken in response to Office Actions issued by a patent office, together with an array of views illustrating analytics of selected patent matters. The analytics may be of any type described further above in relation to modules 212 through 222 above. In various embodiments, the docket or action dates are embedded, associated with or otherwise saved with the documents uploaded into matter database 204.

In some embodiments, the general analytics view comprises a view selected from the group of views comprising: reference analysis, patent matter analysis, reference highlights, office action activity, reference submission due dates (selected by user element 424), foreign filing due dates (selected by user element 422), and patent prosecution process options (selected by user element 426). As shown in FIG. 4, the first through fifth elements (408-416) are initially provided in the same view. Pie charts 428 and bar charts 430 may be provided along with other analytical information.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. in embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
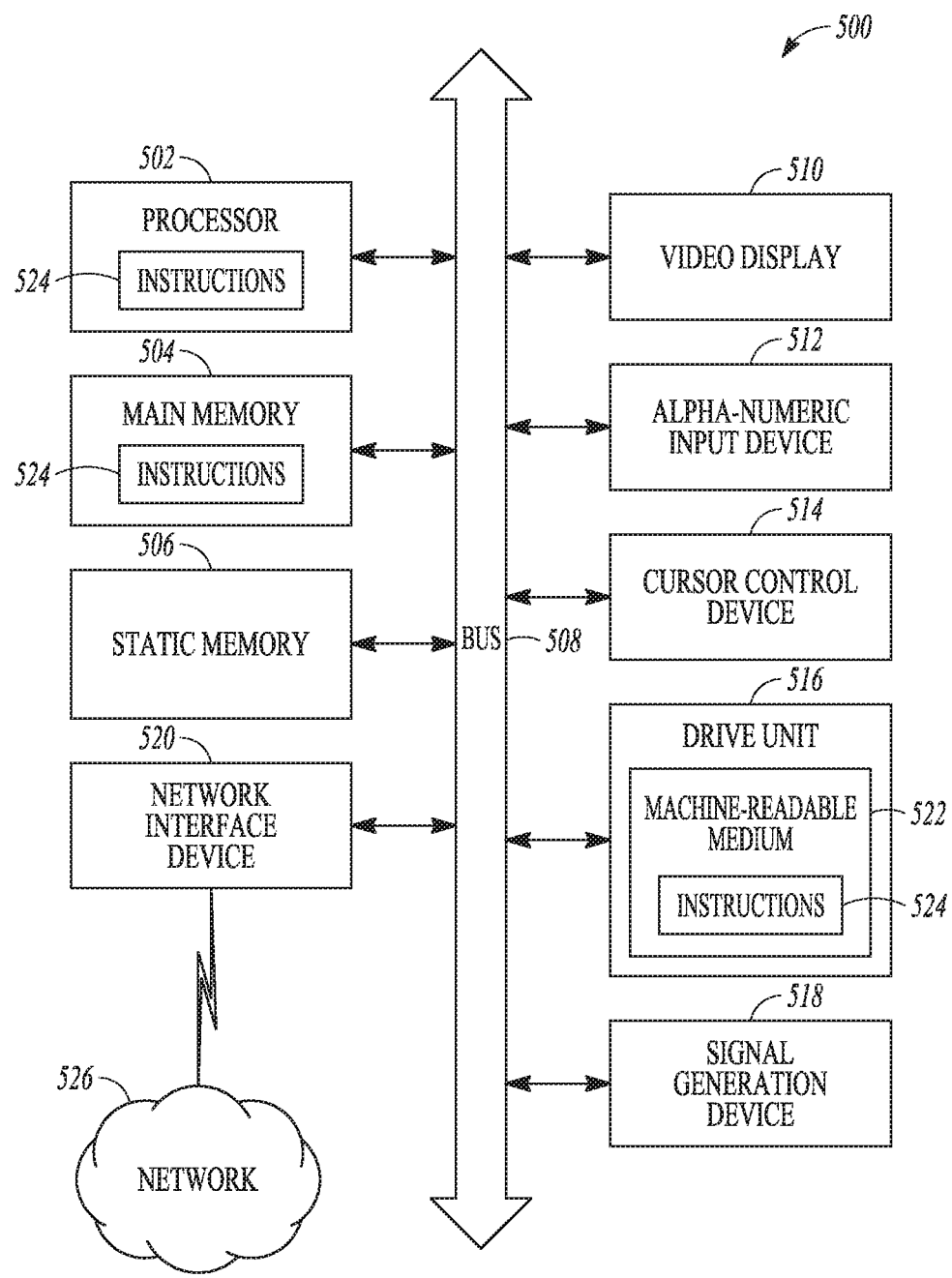
FIG. 5 is a block diagram of machine in the example form of a computer system within which a set of instructions, for causing the machine to perform any one or more of the methodologies herein discussed, may be executed.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Note on the Abstract

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   identifying a patent matter in a non-allowance state, wherein a patent examiner is associated with the patent matter;
   receiving data from an external patent database, wherein the data includes office action activity and responses for a plurality of patent matters associated with the patent examiner;
   analyzing the office action activity and responses to identify a set of responses based on the set of responses including an allowance of at least one claim that includes at least one amendment;
   generating a prosecution profile for the patent examiner including patent prosecution analytics, wherein the patent prosecution analytics is based on the set of responses;
   analyzing the patent prosecution analytics for the prosecution profile to determine prosecution metrics for the prosecution profile;
   generating a set of claim amendments for the patent matter in the non-allowance state using the prosecution metrics; and
   applying the set of claim amendments to claims of the patent matter in the non-allowance state.

2. The method of claim 1, wherein analyzing the office action activity and responses further comprises identifying a non-allowance set of responses, wherein the non-allowance set of responses is based on identifying responses with an allowance of none of the claims.

3. The method of claim 2, further comprising:
   identifying a set of non-allowed claims for the non-allowance set of responses, wherein analyzing the patent prosecution analytics includes evaluating the set of non-allowed claims from the non-allowance set of responses.

4. The method of claim 3, wherein the patent prosecution analytics includes an allowance rate based on a set of allowed claims and the set of non-allowed claims from the plurality of patent matters associated with the patent examiner.

5. The method of claim 1, further comprising:
   identifying a ground of rejection for the patent matter in the non-allowance state, wherein analyzing the patent prosecution analytics includes evaluating the ground of rejection.

6. The method of claim 1, further comprising:
   identifying a set of keywords in the at least one amendment;
   performing a keyword analysis based on occurrences of keywords of the set of keywords; and
   updating the prosecution metrics based on the keyword analysis.

7. The method of claim 1, further comprising filtering a set of allowed claims including the at least one claim based on a date to generate a filtered claims view, wherein the filtered claims view includes the at least one amendment.

8. A system comprising:
   at least one processor; and
   memory including instructions that, when executed by the at least one processor, cause the at least one processor to:
      identify a patent matter in a non-allowance state, wherein a patent examiner is associated with the patent matter;
      receive data from an external patent database, wherein the data includes office action activity and responses for a plurality of patent matters associated with the patent examiner;
      analyze the office action activity and responses to identify a set of responses based on the set of responses including an allowance of at least one claim that includes at least one amendment;
      generate a prosecution profile for the patent examiner including patent prosecution analytics, wherein the patent prosecution analytics is based on the set of responses;
      analyze the patent prosecution analytics for the prosecution profile to determine prosecution metrics for the prosecution profile;
      generate a set of claim amendments for the patent matter in the non-allowance state, using the prosecution metrics; and
      apply the set of claim amendments to claims of the patent matter in the non-allowance state.

9. The system of claim 8, wherein analyzing the office action activity and responses further comprising instructions to identify a non-allowance set of responses, wherein the non-allowance set of responses is based on identifying responses with an allowance of none of the claims.

10. The system of claim 9, further comprising instructions to:
    identify a set of non-allowed claims for the non-allowance set of responses, wherein analyzing the patent prosecution analytics includes evaluating the set of non-allowed claims from the non-allowance set of responses.

11. The system of claim 10, wherein the patent prosecution analytics includes an allowance rate based on a set of allowed claims and the set of non-allowed claims from the plurality of patent matters associated with the patent examiner.

12. The system of claim 8, further comprising instructions to:
    identify a ground of rejection for the patent matter in the non-allowance state, wherein analyzing the patent prosecution analytics includes evaluating the ground of rejection.

13. The system of claim 8, further comprising instructions to:
    identify a set of keywords in the at least one amendment;
    perform a keyword analysis based on occurrences of keywords of the set keywords; and
    update the prosecution metrics based on the keyword analysis.

14. The system of claim 8, further comprising instructions to filter a set of allowed claims including the at least one claim based on a date to generate a filtered claims view, wherein the filtered claims view includes the at least one amendment.

15. At least one non-transitory computer readable medium including instructions that when executed by at least one processor, cause the at least one processor to:
- identify a patent matter in a non-allowance state, wherein a patent examiner is associated with the patent matter;
- receive data from an external patent database, wherein the data includes office action activity and responses for a plurality of patent matters associated with the patent examiner;
- analyze the office action activity and responses to identify a set of responses based on the set of responses including an allowance of at least one claim that includes at least one amendment;
- generate a prosecution profile for the patent examiner including patent prosecution analytics, wherein the patent prosecution analytics is based on the set of responses;
- analyze the patent prosecution analytics for the prosecution profile to determine prosecution metrics for the prosecution profile;
- generate a set of claim amendments for the patent matter in the non-allowance state, using the prosecution metrics; and
- apply the set of claim amendments to claims of the patent matter in the non-allowance state.

16. The at least one non-transitory computer readable medium of claim 15, wherein analyzing the office action activity and responses further comprises instructions to identify a non-allowance set of responses, wherein the non-allowance set of responses is based on identifying responses with an allowance of none of the claims.

17. The at least one non-transitory computer readable medium of claim 16, further comprising instructions to:
- identify a set of non-allowed claims for the non-allowance set of responses, wherein analyzing the patent prosecution analytics includes evaluating the set of non-allowed claims from the non-allowance set of responses.

18. The at least one non-transitory computer readable medium of claim 17, wherein the patent prosecution analytics includes an allowance rate based on a set of allowed claims and the set of non-allowed claims from the plurality of patent matters associated with the patent examiner.

19. The at least one non-transitory computer readable medium of claim 15, further comprising instructions to:
- identify a ground of rejection for the patent matter in the non-allowance state, wherein analyzing the patent prosecution analytics includes evaluating the ground of rejection.

20. The at least one non-transitory computer readable medium of claim 15, further comprising instructions to:
- identify a set of keywords in the at least one amendment;
- perform a keyword analysis based on occurrences of keywords of the set keywords; and
- update the prosecution metrics based on the keyword analysis.

\* \* \* \* \*

UNITED STATES PATENT AND TRADEMARK OFFICE
CERTIFICATE OF CORRECTION

PATENT NO. : 11,360,988 B2
APPLICATION NO. : 17/037223
DATED : June 14, 2022
INVENTOR(S) : Steven W. Lundberg It is certified that error appears in the above-identified patent and that said Letters Patent is hereby corrected as shown below:

On the Title Page

On page 4, in Column 1, Item (56) under "U.S. Patent Documents", Line 55, delete "2007/0029461" and insert --2007/0294610-- therefor On page 7, in Column 2, Item (56) under "Other Publications", Line 33, delete "13/253,846," and insert --13/253,825,-- therefor On page 10, in Column 1, Item (56) under "Other Publications", Line 57, delete "13/310,411," and insert --13/310,417,-- therefor On page 10, in Column 1, Item (56) under "Other Publications", Line 59, delete "13/310,411," and insert --13/310,417,-- therefor On page 10, in Column 1, Item (56) under "Other Publications", Line 61, delete "13/310,411," and insert --13/310,417,-- therefor On page 12, in Column 2, Item (56) under "Other Publications", Line 17, delete "Jan. 14," and insert --Jul. 14,-- therefor In the Claims In Column 24, Line 60, in Claim 13, after "set", insert --of--

In Column 26, Line 25, in Claim 20, after "set", insert --of--

Signed and Sealed this
Fourth Day of April, 2023

Katherine Kelly Vidal
*Director of the United States Patent and Trademark Office*